(12) United States Patent
Raval et al.

(10) Patent No.: US 12,422,632 B2
(45) Date of Patent: Sep. 23, 2025

(54) SYSTEMS AND METHODS FOR PASSIVELY-ALIGNED OPTICAL WAVEGUIDE EDGE-COUPLING

(71) Applicant: Ayar Labs, Inc., Santa Clara, CA (US)

(72) Inventors: Manan Raval, Oakland, CA (US); Matthew Sysak, Sunnyvale, CA (US); Chen Li, Santa Clara, CA (US); Chong Zhang, San Jose, CA (US)

(73) Assignee: Ayar Labs, Inc., San Jose, CA (US)

( * ) Notice: Subject to any disclaimer, the term of this patent is extended or adjusted under 35 U.S.C. 154(b) by 0 days.

(21) Appl. No.: 18/463,287

(22) Filed: Sep. 7, 2023

(65) Prior Publication Data

US 2023/0418005 A1     Dec. 28, 2023

Related U.S. Application Data

(62) Division of application No. 17/385,622, filed on Jul. 26, 2021, now Pat. No. 11,762,154.

(60) Provisional application No. 63/059,974, filed on Aug. 1, 2020.

(51) Int. Cl.
*G02B 6/42* (2006.01)
*G02B 6/38* (2006.01)

(52) U.S. Cl.
CPC ........... *G02B 6/423* (2013.01); *G02B 6/4228* (2013.01); *G02B 6/3873* (2013.01); *G02B 6/4234* (2013.01)

(58) Field of Classification Search
CPC .............................. G02B 6/4228; G02B 6/423
See application file for complete search history.

(56) References Cited

U.S. PATENT DOCUMENTS

| | | | | |
|---|---|---|---|---|
| 5,177,804 A | * | 1/1993 | Shimizu | G02B 6/3508 385/20 |
| 5,185,825 A | * | 2/1993 | Shigematsu | G02B 6/3508 385/20 |
| 5,230,030 A | * | 7/1993 | Hartman | G02B 6/42 385/88 |
| 6,393,174 B1 | * | 5/2002 | Karaguleff | G02B 6/3506 385/20 |
| 2010/0220957 A1 | * | 9/2010 | Asahi | G02B 6/4239 385/39 |
| 2012/0134630 A1 | * | 5/2012 | Tsujita | G02B 6/3893 264/1.25 |
| 2013/0084039 A1 | * | 4/2013 | Doany | H01L 21/302 438/31 |

(Continued)

*Primary Examiner* — Michael Stahl
(74) *Attorney, Agent, or Firm* — Penilla IP, APC

(57) ABSTRACT

A first chip includes a first plurality of optical waveguides exposed at a facet of the first chip. A second chip includes a second plurality of optical waveguides exposed at a facet of the second chip. The second chip includes first and second spacers on opposite sides of the second plurality of optical waveguides. The first and second spacers have respective alignment surfaces oriented substantially parallel to the facet of the second chip at a controlled perpendicular distance away from the facet of the second chip. The second chip is positioned with the alignment surfaces of the first and second spacers contacting the facet of the first chip, and with the second plurality of optical waveguides respectively aligned with the first plurality of optical waveguides. The first and second spacers define and maintain an air gap of at least micrometer-level precision between the first and second pluralities of optical waveguides.

19 Claims, 18 Drawing Sheets

(56) References Cited

U.S. PATENT DOCUMENTS

| | | | |
|---|---|---|---|
| 2014/0334781 A1* | 11/2014 | Fiorentino | G02B 6/3855 |
| | | | 29/428 |
| 2016/0252688 A1* | 9/2016 | Barwicz | G02B 6/1225 |
| | | | 385/14 |
| 2017/0003450 A1 | 1/2017 | Rickman et al. | |
| 2019/0391330 A1* | 12/2019 | Martin | G02B 6/24 |

* cited by examiner (View A-A)

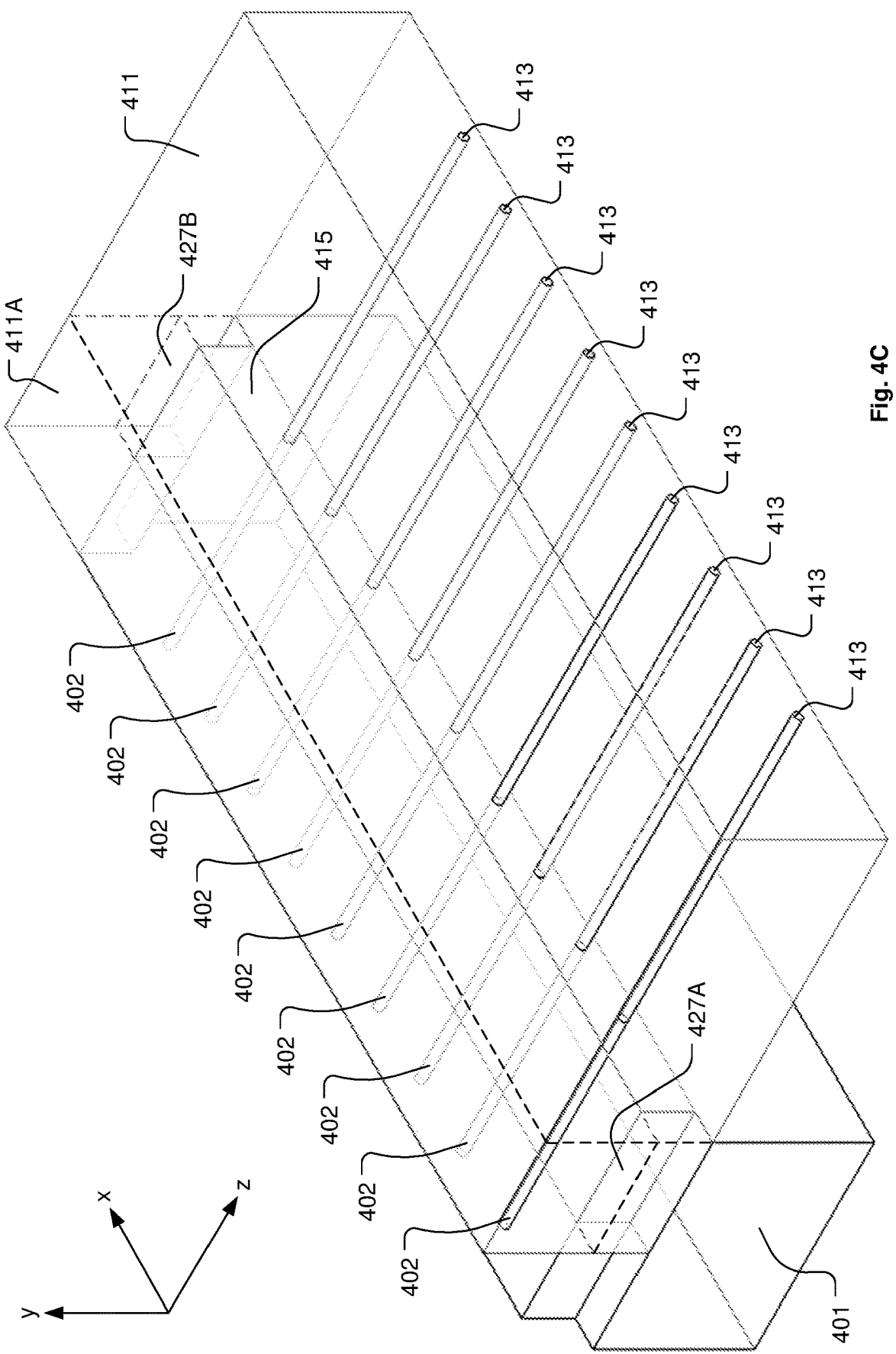

SYSTEMS AND METHODS FOR PASSIVELY-ALIGNED OPTICAL WAVEGUIDE EDGE-COUPLING

CLAIM OF PRIORITY

This application is a divisional application under 35 U.S.C. 121 of U.S. Non-Provisional patent application Ser. No. 17/385,622, filed on Jul. 26, 2021, which claims priority under 35 U.S.C. 119(e) to U.S. Provisional Patent Application No. 63/059,974, filed on Aug. 1, 2020. The disclosure of each above-identified patent application is incorporated herein by reference in its entirety for all purposes.

BACKGROUND

1. Field of the Invention

The present invention relates to optical data communication.

2. Description of the Related Art

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient devices for modulating optical signals and for receiving optical signals. It is within this context that the present invention arises.

SUMMARY

In an example embodiment, a system for edge-coupling of electro-optic chips is disclosed. The system includes a first chip that includes a facet formed at an edge of the first chip. The first chip includes a first plurality of optical waveguides exposed at the facet of the first chip. The system also includes a second chip that includes a facet formed at an edge of the second chip. The second chip includes a second plurality of optical waveguides exposed at the facet of the second chip. The second plurality of optical waveguides is positioned to align with the first plurality of optical waveguides when the second chip is edge-coupled to the first chip. The second chip includes a first spacer located on a first side of the second plurality of optical waveguides. The second chip includes a second spacer located on a second side of the second plurality of optical waveguides. The first spacer has an alignment surface oriented substantially parallel to the facet of the second chip. The second spacer also has an alignment surface oriented substantially parallel to the facet of the second chip. The alignment surfaces of the first and second spacers are positioned a controlled distance away from the facet of the second chip as measured in a direction perpendicular to the facet of the second chip. The second chip is positioned with the alignment surfaces of the first and second spacers in contact the facet of the first chip, and with the second plurality of optical waveguides respectively aligned with the first plurality of optical waveguides. The first and second spacers define and maintain an air gap between the first and second pluralities of optical waveguides. The air gap has a size equal to the controlled distance as measured in the direction perpendicular to the facet of the second chip.

In an example embodiment, a method is disclosed for edge-coupling of electro-optic chips. The method includes forming a facet at an edge of a first chip so that a first plurality of optical waveguides is exposed at the facet of the first chip. The method also includes forming a facet at an edge of a second chip so that a second plurality of optical waveguides is exposed at the facet of the second chip. The facet of the second chip is formed so that the second chip includes a first spacer located on a first side of the second plurality of optical waveguides and a second spacer located on a second side of the plurality of optical waveguides. The first spacer has an alignment surface oriented substantially parallel to the facet of the second chip. The second spacer also has an alignment surface oriented substantially parallel to the facet of the second chip. The facet of the second chip is formed so that the alignment surfaces of the first and second spacers are positioned a controlled distance away from the facet of the second chip as measured in a direction perpendicular to the facet of the second chip. The method also includes positioning the second chip against the first chip so that the alignment surfaces of the first and second spacers contact the facet of the first chip, and so that the second plurality of optical waveguides respectively align with the first plurality of optical waveguides. The first and second spacers define and maintain an air gap between the first and second pluralities of optical waveguides. The air gap has a size equal to the controlled distance as measured in the direction perpendicular to the facet of the second chip.

In an example embodiment, a system is disclosed for edge-coupling of electro-optic chips. The system includes a first chip that includes a facet formed at an edge of the first chip. The first chip includes a first plurality of optical waveguides exposed at the facet of the first chip. The system also includes a second chip that includes a facet formed at an edge of the second chip. The second chip includes a second plurality of optical waveguides exposed at the facet of the second chip. The second plurality of optical waveguides is positioned to align with the first plurality of optical waveguides when the second chip is edge-coupled to the first chip. The second chip is positioned with the facet of the second chip in contact with the facet of the first chip, and with the second plurality of optical waveguides respectively aligned with the first plurality of optical waveguides, such that there is substantially no gap between facet of the second chip and the facet of the first chip.

In an example embodiments, a method is disclosed for edge-coupling of electro-optic chips. The method includes forming a facet at an edge of a first chip so that a first plurality of optical waveguides is exposed at the facet of the first chip. The method also includes forming a first lateral alignment trench within the first chip on a first side of the first plurality of optical waveguides. The method also includes forming a second lateral alignment trench within the first chip on a second side of the first plurality of optical waveguides. The method also includes forming a facet at an edge of a second chip so that a second plurality of optical waveguides is exposed at the facet of the second chip. The facet of the second chip is formed so that the second chip includes a first lateral alignment feature located on a first side of the second plurality of optical waveguides and a second lateral alignment feature located on a second side of the second plurality of optical waveguides. The first lateral alignment feature is formed to fit into the first lateral alignment trench of the first chip. The second lateral alignment feature is formed to fit into the second lateral alignment trench of the first chip. The facet of the second chip is also formed to extend a specified distance into the second chip so that a portion of the second chip extends from the facet of the second chip over at least a portion of the first chip when the second chip is positioned against the first chip. The specified distance is defined to achieve vertical alignment of the second plurality of optical waveguides with the first plurality of optical waveguides. The method also includes positioning the second chip against the first chip so that the facet of the second chip contacts the facet of the first chip, and so that the second plurality of optical waveguides respectively align with the first plurality of optical waveguides.

Other aspects and advantages of the disclosed embodiments will become more apparent from the following detailed description, taken in conjunction with the accompanying drawings, illustrating by way of example the disclosed embodiments.

BRIEF DESCRIPTION OF THE DRAWINGS

FIG. 4C shows a perspective view of the second chip positioned in an edge-coupled configuration with the first chip, in accordance with some embodiments.

DETAILED DESCRIPTION

Figure 1A:
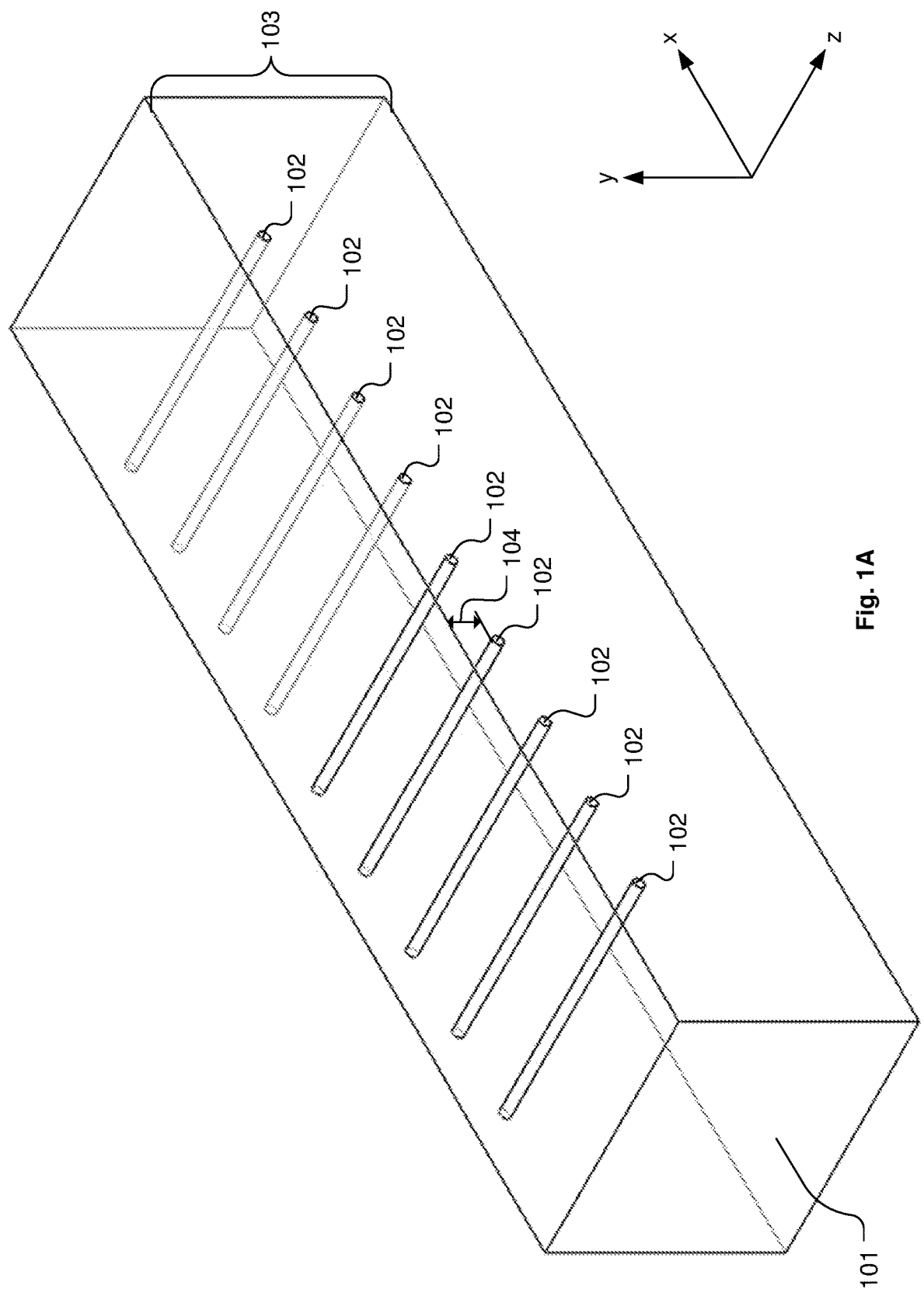
FIG. 1A shows a perspective view of the first chip, in accordance with some embodiments.

In the following description, numerous specific details are set forth in order to provide an understanding of the disclosed embodiments. It will be apparent, however, to one skilled in the art that the present invention may be practiced without some or all of these specific details. In other instances, well known process operations have not been described in detail in order not to unnecessarily obscure the disclosed embodiments.

Optical data communication systems often include integrated optical systems. In some embodiments, packaging of integrated optical systems is done by direct edge-coupling of optical waveguides on two different chips. For example, in some embodiments, packaging of integrated optical systems includes optical waveguide-to-optical waveguide coupling of light between photonic integrated circuits (PICs) on two different chips implemented in different material systems. Chip-to-chip optical edge-coupling requires precise lateral and vertical alignment of the optical modes of the optical waveguides on the two chips. In some implementations of chip-to-chip optical edge-coupling, it is also required to maintain a small but controlled gap between the facets of the different chips. Actively controlling the facet-to-facet gap between two chips on a micrometer-level or sub-micrometer level while also achieving satisfactory optical alignment of the optical modes of the optical waveguides on the two chips requires a state-of-the-art chip-to-chip alignment engine, which demands significant capital investment. Also, active optical chip-to-chip alignment processes require electrification (powering on) of at least one photonic device on at least one of the two chips during the optical alignment process in order to close an optical loopback as needed to detect optical alignment of the optical waveguides. It should be appreciated that having to electrify the photonic device in the active optical chip-to-chip alignment process puts a constraint on the assembly order of operation required for packaging of the integrated optical system. While active optical chip-to-chip alignment is still possible in many cases, passive optical chip-to-chip alignment is more cost-effective and offers much higher production capacity, making it a desirable option in high-volume integrated optical system manufacturing.

Various embodiments are disclosed herein for passively controlling the alignment of optical waveguides on two chips along various axes, e.g., in the x-direction, y-direction, and/or z-direction, by photolithographically defining one or more spacer feature(s) to be etched on the facet of one or both chips, and by controlling a depth of the facet etch used to form the spacer feature(s). Since photolithography-based semiconductor manufacturing processes allows for the patterning and fabrication of sub-micrometer sized features, the embodiments disclosed herein provide for implementation of an air gap between optically aligned optical waveguides in respective chips with micrometer-level or sub-micrometer-level precision and without requiring use of active optical alignment of the optical waveguides in the respective chips in the direction of light propagation. Additionally, the facet etch depth used to form the facet and spacer feature(s), as well as the shape of the spacer feature(s), are controlled to enable passive optical alignment of the optical waveguides in the respective chips in the lateral direction (e.g., x-direction) and vertical direction (e.g., y-direction) in the plane (e.g., x-y plane) normal to the direction of light propagation (e.g., z-direction).

Embodiments are also disclosed herein in which two chips are edge coupled without having an air gap (essentially no air gap except for that caused by manufacturing tolerances) between optically aligned optical waveguides in the respective chips. These embodiments provide for passive alignment of the optical waveguides in the lateral direction (e.g., x-direction) by having lateral alignment features on one chip and corresponding lateral alignment trenches on the other chip, where the lateral alignment features are configured to fit into the lateral alignment trenches, respectively. Also, these embodiments provide for passive alignment of the optical waveguides in the vertical direction (e.g., y-direction) in the plane (e.g., x-y plane) normal to the direction of light propagation (e.g., z-direction) by having a portion of one chip that extends from the facet location to contact a surface of the other chip and thereby provide a reference structure for alignment of the optical waveguides in the vertical direction.

As mentioned above, one approach for chip-to-chip optical alignment and coupling (for optical alignment and coupling of optical waveguides within two different chips) involves edge-coupling of the two chips by using active control of the facet-to-facet separation distance between the two chips, where the optical waveguides in the respective chips that are to be optically aligned and coupled are exposed at respective facets of the two chips. In some cases, an index-matched epoxy is disposed between the facets of the two chips, where the optical waveguides in the respective chips that are to be optically aligned and coupled are exposed at the facets of the two chips. When the index-matched epoxy is initially disposed between the two facets of the two chips, the index-matched epoxy has an optical index of refraction that substantially matches that of the optical waveguides in the two chips. However, as the epoxy is exposed over time to high optical intensities associated with light transmission between the aligned/coupled optical waveguides in the two chips, the light transmission properties of the epoxy degrades, which in turn degrades the light coupling efficiency between the aligned/coupled optical waveguides in the two chips. Therefore, in some embodiments, it is advantageous to have the optical waveguides of the two attached chips aligned and optically coupled to each other without use of the index-matched epoxy between the facets of the two chips.

In some embodiments, it is advantageous to have an air gap between the facets of the two chips, as opposed to having the index-matched epoxy disposed between the facets of the two chips, where the optical waveguides of the two chips are aligned and optically coupled to each other through/across the air gap. However, such use of an air gap between the facets of the two chips at which the respective optical waveguides are exposed requires maintaining a carefully controlled non-zero, but very small (on the order of a micrometer-level or sub-micrometer-level), facet-to-facet separation distance between the two chips in order to achieve sufficiently high light coupling efficiency between the aligned and optically coupled optical waveguides in the two chips. Precise micrometer-level or sub-micrometer-level control of this facet-to-facet separation distance between the two chips is needed in order to sufficiently form and maintain the air gap between the aligned and coupled optical waveguides in the two chips. However, this precise micrometer-level or sub-micrometer-level control of the facet-to-facet separation distance is very challenging, time-consuming, and expensive with currently available active optical alignment tools used for optical waveguide-to-optical waveguide alignment, especially considering that the active optical alignment process requires powering on of a photonic circuit in at least one of the two chips during the active alignment process.

For example, some approaches for chip-to-chip optical alignment and coupling require active optical alignment of the optical waveguides in the respective chips in the vertical direction (y-direction) and lateral direction (x-direction), where the vertical and lateral directions define the plane perpendicular to the optical waveguide-to-optical waveguide light propagation direction between the two chips. It should be understood that active optical alignment uses chip-to-chip transmission and detection of light to determine when the optical waveguides of the two chips are properly optically aligned. In contrast, passive optical alignment advantageously does not require chip-to-chip transmission and detection of light to determine when the optical waveguides of the two chips are optically aligned. Additionally, passive optical alignment of optical waveguides in the two chips along any given axis (vertical or lateral) is more suitable for high-volume manufacturing than active optical alignment, particularly with respect to reliability, cost, and throughput.

In view of the foregoing, in a chip-to-chip optical edge-coupled configuration, instead of using active optical alignment to achieve and maintain an air gap between optically aligned/coupled optical waveguides of the two chips with sufficiently precise facet-to-facet distance control, and instead of using the aging-vulnerable index-matched epoxy between optically aligned/coupled optical waveguides of two chips, various embodiments are disclosed herein in which one or more photolithographically defined spacer feature(s) is/are formed in the etched facet of one or both of the chips in order to passively achieve and maintain an air gap between the aligned/coupled optical waveguides of the two chips with micrometer-level or sub-micrometer-level precision control of the facet-to-facet separation distance between the two chips. The size of the air gap between the aligned/coupled optical waveguides of the two chips (the facet-to-facet separation distance) that is defined by the spacer feature(s) is defined such that a coarse lateral and vertical alignment of the two chips with respect to each other will produce a detectable initial optical signal ("first light" signal) corresponding to proper optical alignment/coupling of the optical waveguides in the respective chips. Also, in some embodiments, a depth of the etched spacer feature in the vertical direction (y-direction) on the facet(s) of one or both chips is used to passively align the optical waveguides of the two chips in the vertical direction across the facets of the chips. Also, in some embodiments, both chips are etched to form features that physically fit together to enable passive alignment of the optical waveguides of the two chips in the lateral direction (x-direction) across the facets of the two chips.

For ease of description, the term chip as used herein refers to a semiconductor chip (or semiconductor die) that includes electro-optic devices. In various embodiments, any chip referred to herein is a silicon-on-insulator (SOI) chip and/or a Complementary Metal Oxide Semiconductor (CMOS) chip. In various embodiments, any chip referred to herein includes electrical devices, optical devices, electro-optic devices, and/or thermo-optical devices, and corresponding electrical circuitry and optical circuitry. In some embodiments, any of the chips referred to herein is a TeraPHY™ semiconductor chip as provided by Ayar Labs, Inc. of Santa Clara, California, as described in U.S. patent application Ser. No. 16/510,821, which is incorporated herein by reference in its entirety. However, it should be understood that any of the chips referred to herein can be essentially any type of electro-optic chip, whether it be the TeraPHY™ chip or another type of electro-optic chip.

Also, the term "light" as used herein refers to electromagnetic radiation within a portion of the electromagnetic spectrum that is usable by optical data communication systems. In some embodiments, the portion of the electromagnetic spectrum includes light having wavelengths within a range extending from about 1100 nanometers to about 1565 nanometers (covering from the O-Band to the C-Band, inclusively, of the electromagnetic spectrum). However, it should be understood that the portion of the electromagnetic spectrum as referred to herein can include light having wavelengths either less than 1100 nanometers or greater than 1565 nanometers, so long as the light is usable by an optical data communication system for encoding, transmission, and decoding of digital data through modulation/de-modulation of the light. In some embodiments, the light used in optical data communication systems has wavelengths in the near-infrared portion of the electromagnetic spectrum.

FIGS. 1A through 1E show a chip-to-chip optical alignment and optical coupling system in which an air gap is passively defined and maintained between a facet 103 of a first chip 101 and a facet 115 of a second chip 111, in accordance with some embodiments. FIG. 1A shows a perspective view of the first chip 101, in accordance with some embodiments. The first chip 101 includes a number of optical waveguides 102 extending to the facet 103 for optical edge-coupling of the first chip 101 to the second chip 111. The optical waveguides 102 are exposed at the surface of the facet 103 such that the optical waveguides 102 can be optically aligned and coupled to corresponding optical waveguides 113 in the second chip 111. In some embodiments, the facet 103 corresponds to a side (or edge) of the first chip 101. In the example of FIG. 1A, the facet 103 is oriented substantially parallel to an x-y reference plane, and portions of the optical waveguides 102 near the facet 103 are integrated within the first chip 101 to extend in a z-direction substantially perpendicular to the facet 103. In some embodiments, the optical waveguides 102 of the first chip 101 are formed such that a substantially uniform material thickness 104 exists above the optical waveguides 102. It should be understood that in various embodiments, the first chip 101 can include any number of optical waveguides 102. Also, in various embodiments, the first chip 101 can have any type of facet 103, such as an etched facet, a polished facet, or a cleaved facet.

It should be understood that for ease of description and to avoid unnecessarily obscuring the disclosure of the embodiments herein, FIG. 1A shows an example portion of the first chip 101 next to the facet 103. It should be understood that the first chip 101 includes additional portions and features beyond what is shown in the example of FIG. 1A. Also, it should be understood that the optical waveguides 102 of the first chip 101 are optically connected to photonic components and/or photonic circuits formed within the first chip 101, which are also not shown to avoid unnecessarily obscuring description of the chip-to-chip optical alignment and optical coupling system of FIGS. 1A through 1E.

Figure 1B:
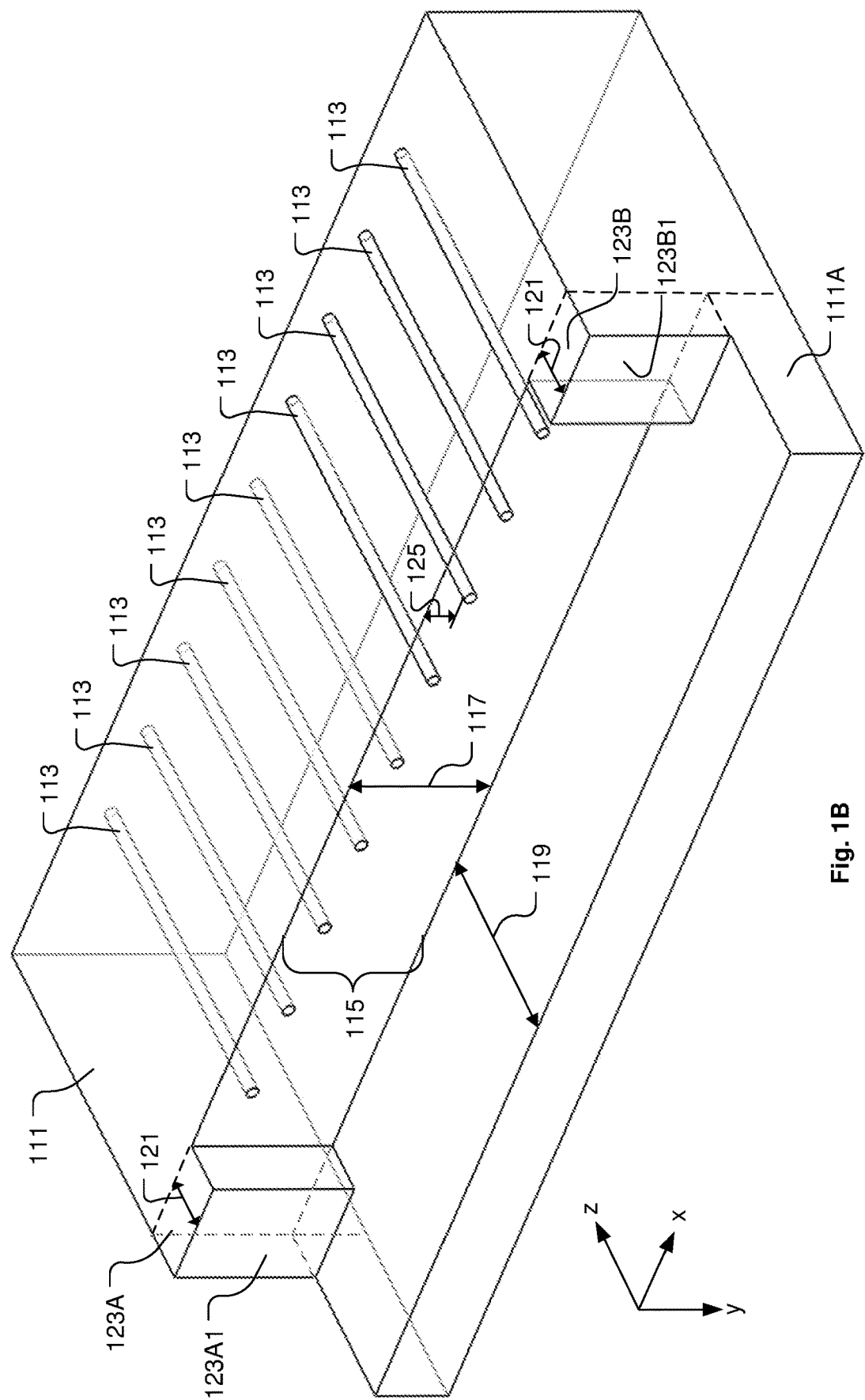
FIG. 1B shows a perspective view of the second chip, in accordance with some embodiments.

FIG. 1B shows a perspective view of the second chip 111, in accordance with some embodiments. The second chip 111 includes the optical waveguides 113 extending to a facet 115 of the second chip 111 for optical edge-coupling of the second chip 111 to the first chip 101. The optical waveguides 113 are exposed at the surface of the facet 115 such that the optical waveguides 113 can be optically aligned and coupled to corresponding optical waveguides 102 in the first chip 101. In some embodiments, the facet 115 corresponds to a side (or edge) of the second chip 111. In the example of FIG. 1B, the facet 115 is oriented substantially parallel to the x-y reference plane, and portions of the optical waveguides 113 near the facet 115 are integrated within the second chip 111 to extend in a z-direction substantially perpendicular to the facet 115. In some embodiments, the optical waveguides 113 of the second chip 111 are formed such that a substantially uniform material thickness 125 exists above each of the optical waveguides 113. It should be understood that in various embodiments the second chip 111 can include any number of optical waveguides 113. The optical waveguides 113 of the second chip 111 are to be respectively optically coupled to the optical waveguides 102 of the first chip 101. Therefore, in some embodiments, the optical waveguides 113 of the second chip 111 are positioned to align with the optical waveguides 102 of the first chip 101 when the second chip 111 is properly aligned with the first chip 101.

It should be understood that for ease of description and to avoid unnecessarily obscuring the disclosure of the embodiments herein, FIG. 1B shows an example portion of the second chip 111 next to the facet 115. It should be understood that the second chip 111 includes additional portions and features beyond what is shown in the example of FIG. 1B. Also, it should be understood that the optical waveguides 113 of the second chip 111 are optically connected to photonic components and/or photonic circuits formed within the second chip 111, which are also not shown to avoid unnecessarily obscuring description of the chip-to-chip optical alignment and optical coupling system of FIGS. 1A through 1E.

The facet 115 of the second chip 111 is etched into the second chip 111 by a distance 119 in the z-direction and by a distance 117 in the y-direction to form photolithographically patterned spacers 123A and 123B on the lateral sides, respectively, of the facet 115, relative to the x-direction. The facet 115 is positioned the distance 119 from the edge of the second chip 111, such that a portion 111A of the second chip 111 extends from the facet 115 to the edge of the second chip 111. The first spacer 123A is positioned at a first end of the facet 115, and the second spacer 123B is positioned at a second end of the facet 115. The first spacer 123A and the second spacer 123B are positioned in the x-direction on each side of the array of optical waveguides 113 so as to bracket the array of optical waveguides 113. The first spacer 123A and the second spacer 123B are formed to provide for passive control of an air gap size 121 (as measured in the z-direction) between the facet 103 of the first chip 101 and the facet 115 of the second chip 111 when the second chip 111 is edge-coupled to the first chip 101. In some embodiments, the first spacer 123A and the second spacer 123B are formed to have substantially co-aligned exposed surfaces 123A1 and 123B1, respectively, oriented substantially parallel to the x-y plane and substantially parallel to the facet 115 surface. In this manner, a substantially uniform distance is maintained between the exposed optical waveguides 113 and the surfaces 123A1 and 123B1 of the first spacer 123A and the second spacer 123B, respectively, across the facet 115. In various embodiments, the first spacer 123A and the second spacer 123B are formed with high precision (such as micrometer-level or sub-micrometer-level precision) using semiconductor photolithographic fabrication processes. The first spacer 123A and the second spacer 123B are formed to establish and maintain the micrometer-level or sub-micrometer-level air gap size 121 between the facet 115 of the second chip 111 and the facet 103 of the first chip 101 when the second chip 111 is edge-coupled to the first chip 101. In some embodiments, the air gap size 121 is within a range extending from about 10 nanometers to about 10 micrometers.

Figure 1C:
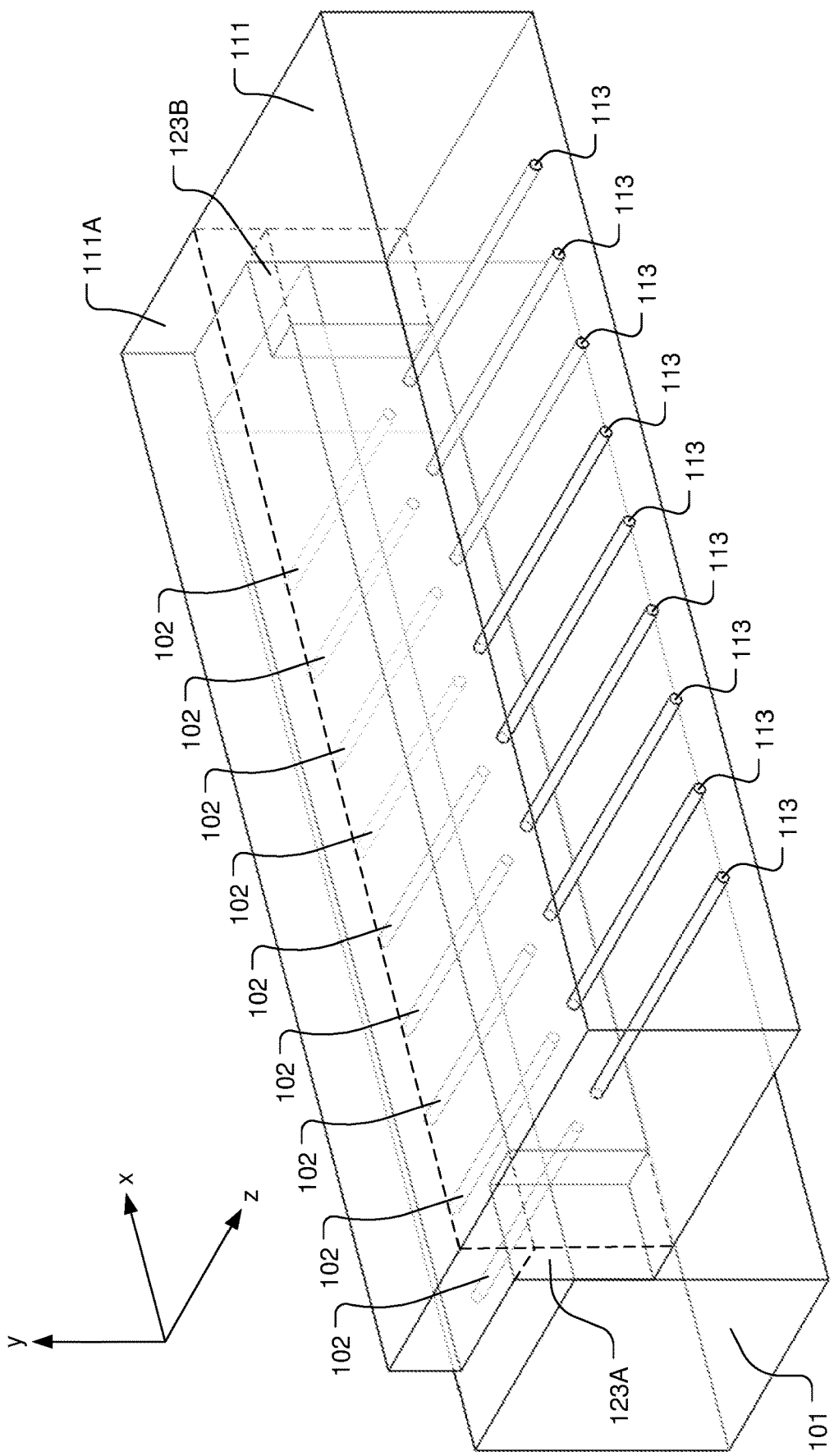
FIG. 1C shows a perspective view of the second chip positioned in an edge-coupled configuration with the first chip, in accordance with some embodiments.

FIG. 1C shows a perspective view of the second chip 111 positioned in an edge-coupled configuration with the first chip 101, in accordance with some embodiments. The second chip 111 is positioned so that the exposed surface 123A1 of the first spacer 123 and the exposed surface 123B1 of the second spacer 123B contact the facet 103 of the first chip 101. The second chip 111 is also positioned vertically in the y-direction to ensure that the portion 111A of the second chip 111 that extends in the z-direction beyond the facet 115 to the edge of the second chip 111 does not collide with the first chip 101 when the second chip 111 is edge-coupled to the first chip 101. In some embodiments, the facet 115 is vertically etched through an entire thickness of the second chip 111 (in the y-direction) so that the second chip 111 does not include the portion 111A that overhangs the first chip 101 when the second chip 111 is edge-coupled to the first chip 101.

Figure 1D:
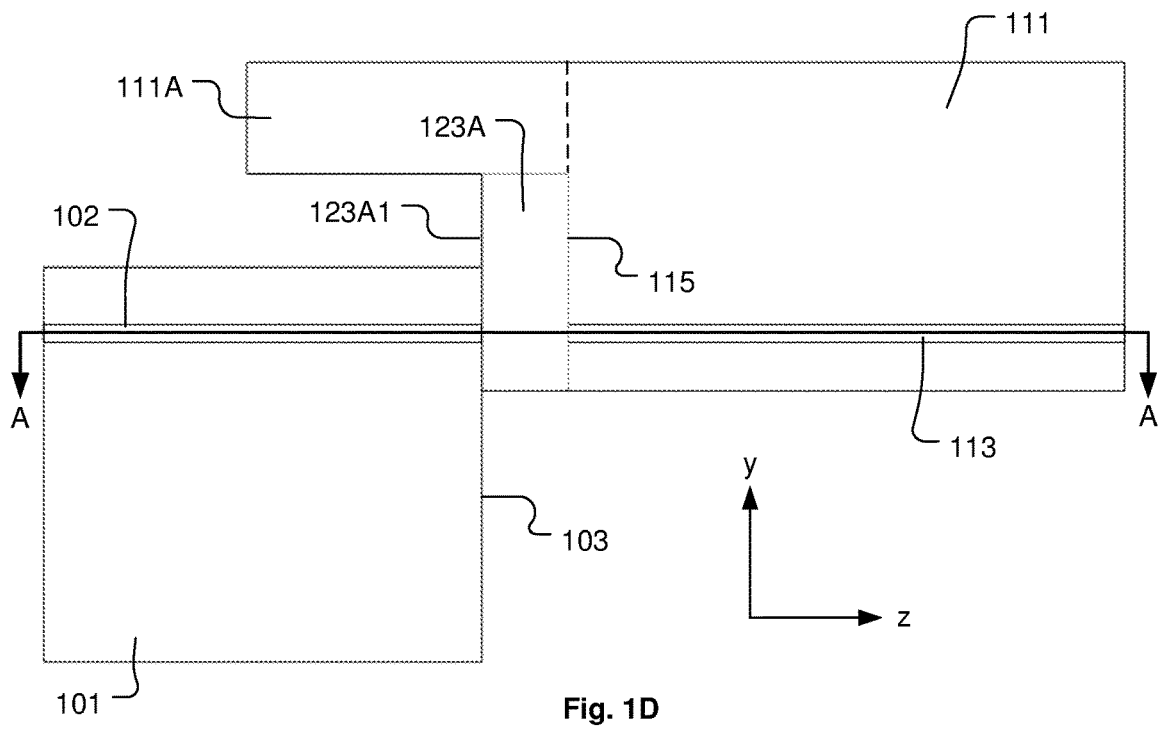
FIG. 1D shows a side view of the first chip and the second chip in the edge-coupled configuration, in accordance with some embodiments.
Figure 1E:
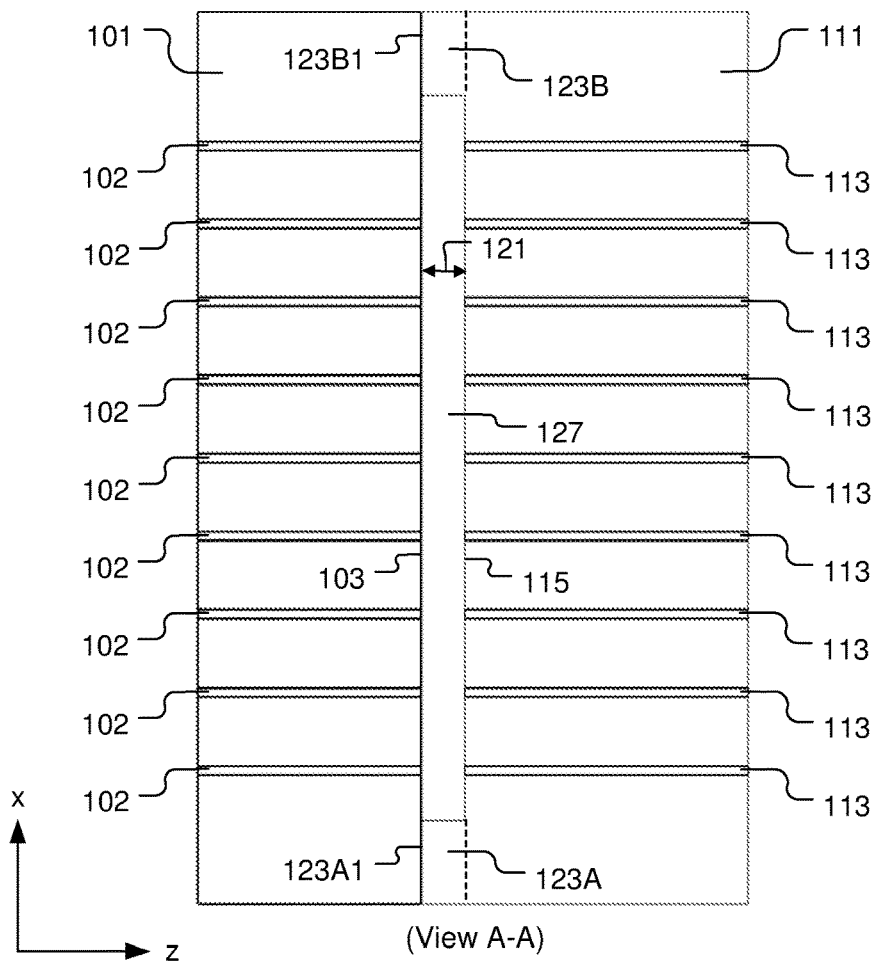
FIG. 1E shows a horizontal cross-section view through the edge-coupling region between the first chip and the second chip, referenced as View A-A in FIG. 1D, in accordance with some embodiments.

FIG. 1D shows a side view of the first chip 101 and the second chip 111 in the edge-coupled configuration, in accordance with some embodiments. The optical waveguides 102 of the first chip 101 are aligned in the vertical direction (y-direction) with the optical waveguides 113 of the second chip 111. FIG. 1E shows a horizontal cross-section view through the edge-coupling region between the first chip 101 and the second chip 111, referenced as View A-A in FIG. 1D, in accordance with some embodiments. The surface 123A1 of the first spacer 123A is in contact with the facet 103 of the first chip 101, and the surface 123B1 of the second spacer 123B is in contact with the facet 103 of the first chip 101. An air gap 127 having the size 121 as measured in the z-direction is established between the facet 103 of the first chip 101 and the facet 115 of the second chip 111. In this manner, the first spacer 123A and the second spacer 123B establish and maintain a substantially uniform and controlled air gap thickness (on the micrometer-level or sub-micrometer level) between the optical waveguides 102 of the first chip 101 and the optical waveguides 113 of the second chip 111, such that respective pairs of the optical waveguides 102 and 113 are optical aligned and optically coupled with each other.

It should be understood that the first spacer 123A and the second spacer 123B on the second chip 111 provide for edge-coupling of the second chip 111 to the first chip 101 without having to utilize active optical alignment techniques to control the air gap distance/size 121 between the facet 115 of the second chip 111 and the facet 103 of the first chip 101. Also, the first spacer 123A and the second spacer 123B on the second chip 111 provide for edge-coupling of the second chip 111 to the first chip 101 without having to dispose an index-matched epoxy between the facet 103 of the first chip 101 and the facet 115 of the second chip 111. Therefore, it should be understood that the chip-to-chip optical alignment and optical coupling system of FIGS. 1A through 1E avoids the disadvantages of having to use active optical alignment techniques and index-matched epoxy when edge-coupling the second chip 111 to the first chip 101.

Figure 2A:
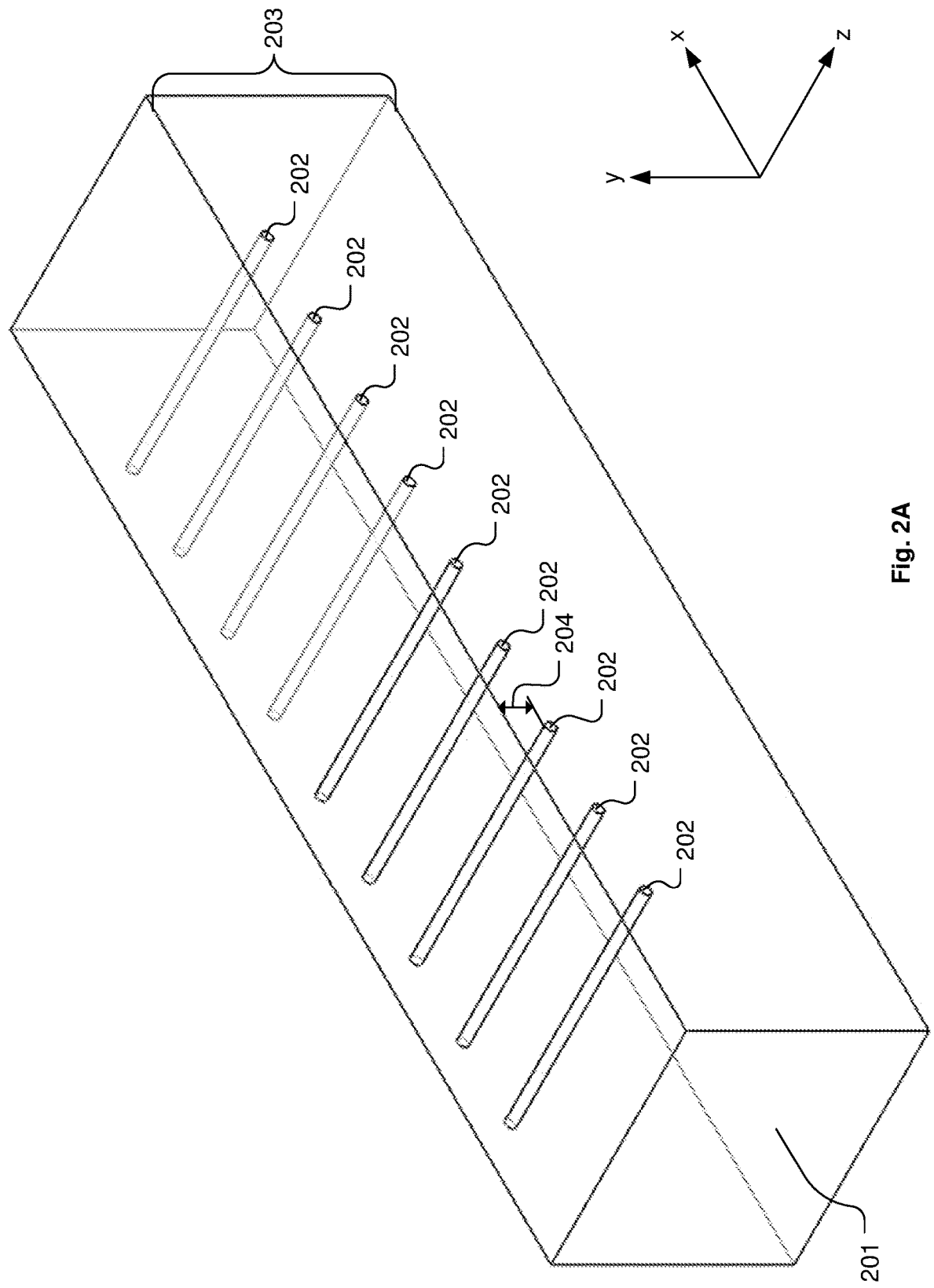
FIG. 2A shows a perspective view of a first chip, in accordance with some embodiments.

FIGS. 2A through 2E show a chip-to-chip optical alignment and optical coupling system in which an air gap is passively defined and maintained between a facet 203 of a first chip 201 and a facet 215 of a second chip 211, in accordance with some embodiments. The chip-to-chip optical alignment and optical coupling system of FIGS. 2A through 2E also provides for passive alignment of the first chip 201 and the second chip 211 in the vertical direction (y-direction). FIG. 2A shows a perspective view of the first chip 201, in accordance with some embodiments. The first chip 201 includes a number of optical waveguides 202 extending to the facet 203 for optical edge-coupling of the first chip 201 to the second chip 211. The optical waveguides 202 are exposed at the surface of the facet 203 such that the optical waveguides 202 can be optically aligned and coupled to corresponding optical waveguides 213 in the second chip 211. In some embodiments, the facet 203 corresponds to a side (or edge) of the first chip 201. In the example of FIG. 2A, the facet 203 is oriented substantially parallel to an x-y reference plane, and portions of the optical waveguides 202 near the facet 203 are integrated within the chip 201 to extend in a z-direction substantially perpendicular to the facet 203. In some embodiments, the optical waveguides 202 of the first chip 201 are formed such that a substantially uniform material thickness 204 exists above the optical waveguides 202. It should be understood that in various embodiments, the first chip 201 can include any number of optical waveguides 202. Also, in various embodiments, the first chip 201 can have any type of facet 203, such as an etched facet, a polished facet, or a cleaved facet.

It should be understood that for ease of description and to avoid unnecessarily obscuring the disclosure of the embodiments herein, FIG. 2A shows an example portion of the first chip 201 next to the facet 203. It should be understood that the first chip 201 includes additional portions and features beyond what is shown in the example of FIG. 2A. Also, it should be understood that the optical waveguides 202 of the first chip 201 are optically connected to photonic components and/or photonic circuits formed within the first chip 201, which are also not shown to avoid unnecessarily obscuring description of the chip-to-chip optical alignment and optical coupling system of FIGS. 2A through 2E.

Figure 2B:
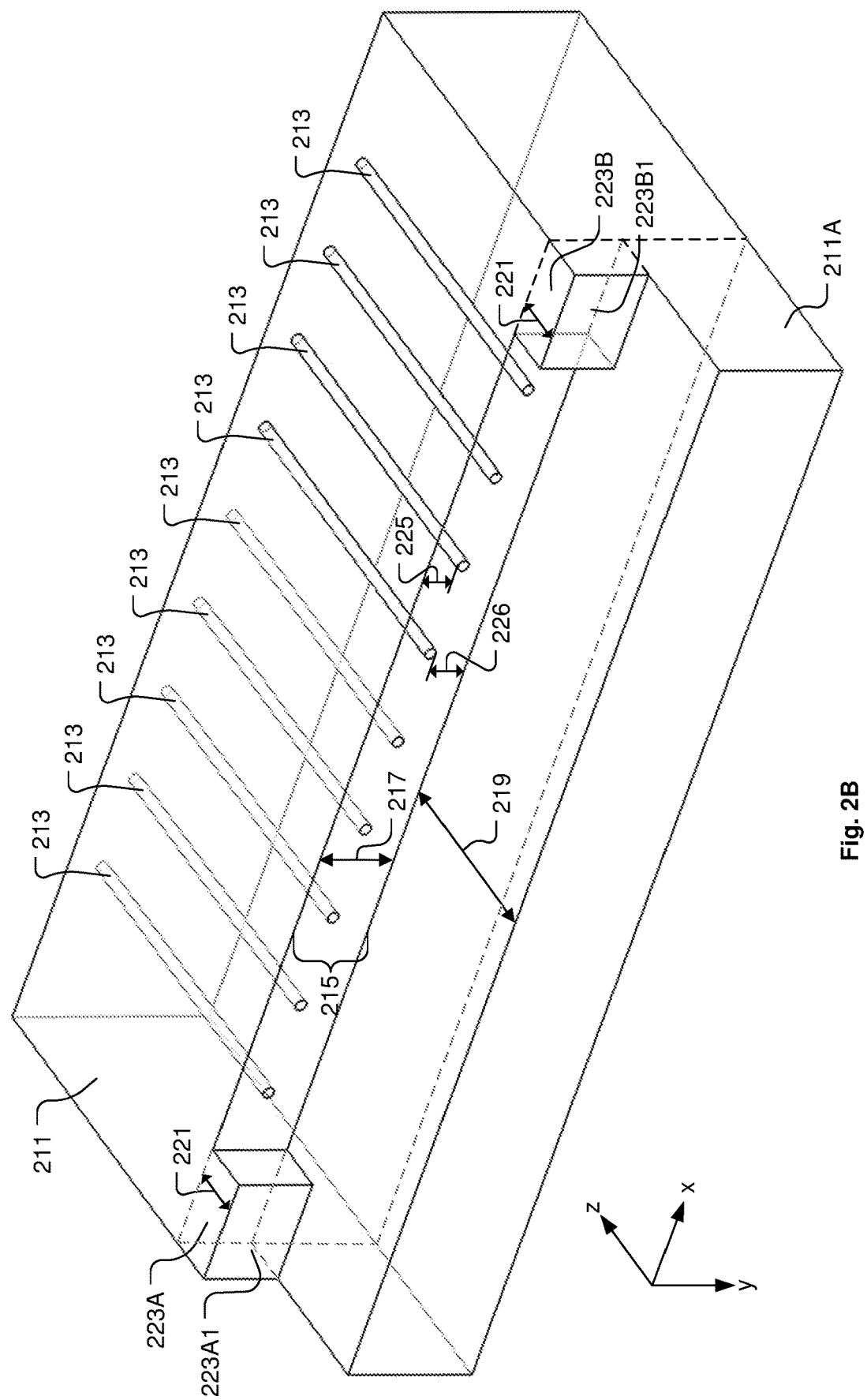
FIG. 2B shows a perspective view of a second chip, in accordance with some embodiments.

FIG. 2B shows a perspective view of the second chip 211, in accordance with some embodiments. The second chip 211 includes the optical waveguides 213 extending to a facet 215 of the second chip 211 for optical edge-coupling of the second chip 211 to the first chip 201. The optical waveguides 213 are exposed at the surface of the facet 215 such that the optical waveguides 213 can be optically aligned and coupled to corresponding optical waveguides 202 in the first chip 201. In some embodiments, the facet 215 corresponds to a side (or edge) of the second chip 211. In the example of FIG. 2B, the facet 215 is oriented substantially parallel to the x-y reference plane, and portions of the optical waveguides 213 near the facet 215 are integrated within the second chip 211 to extend in the z-direction substantially perpendicular to the facet 215. In some embodiments, the optical waveguides 213 of the second chip 211 are formed such that a substantially uniform material thickness 225 exists above each of the optical waveguides 213. It should be understood that in various embodiments the second chip 211 can include any number of optical waveguides 213. The optical waveguides 213 of the second chip 211 are to be respectively optically coupled to the optical waveguides 202 of the first chip 201. Therefore, in some embodiments, the optical waveguides 213 of the second chip 211 are positioned to align with the optical waveguides 202 of the first chip 201 when the second chip 211 is properly aligned with the first chip 201.

It should be understood that for ease of description and to avoid unnecessarily obscuring the disclosure of the embodiments herein, FIG. 2B shows an example portion of the second chip 211 next to the facet 215. It should be understood that the second chip 211 includes additional portions and features beyond what is shown in the example of FIG. 2B. Also, it should be understood that the optical waveguides 213 of the second chip 211 are optically connected to photonic components and/or photonic circuits formed within the second chip 211, which are also not shown to avoid unnecessarily obscuring description of the chip-to-chip optical alignment and optical coupling system of FIGS. 2A through 2E.

The facet 215 of the second chip 211 is etched into the second chip 211 by a distance 219 in the z-direction and by a distance 217 in the y-direction to form photolithographically patterned spacers 223A and 223B on the lateral sides, respectively, of the facet 215, relative to the x-direction. The facet 215 is positioned the distance 219 from the edge of the second chip 211, such that a portion 211A of the second chip 211 extends in the z-direction from the facet 215 to the edge of the second chip 211. The first spacer 223A is positioned at a first end of the facet 215, and the second spacer 223B is positioned at a second end of the facet 215. The first spacer 223A and the second spacer 223B are positioned in the x-direction on each side of the array of optical waveguides 213 so as to bracket the array of optical waveguides 213. The first spacer 223A and the second spacer 223B are formed to provide for passive control of an air gap size 221 (as measured in the z-direction) between the facet 203 of the first chip 201 and the facet 215 of the second chip 211 when the second chip 211 is edge-coupled to the first chip 201. In some embodiments, the first spacer 223A and the second spacer 223B are formed to have substantially co-aligned exposed surfaces 223A1 and 223B1, respectively, oriented substantially parallel to the x-y plane and substantially parallel to the facet 215 surface. In this manner, a substantially uniform distance is maintained between the exposed optical waveguides 213 and the surfaces 223A1 and 223B1 of the first spacer 223A and the second spacer 223B, respectively, across the facet 215. The first spacer 223A and the second spacer 223B are formed with high precision (such as micrometer-level or sub-micrometer-level precision) using semiconductor photolithographic fabrication processes. The first spacer 223A and the second spacer 223B are formed to establish and maintain the micrometer-level or sub-micrometer-level air gap size 221 between the facet 215 of the second chip 211 and the facet 203 of the first chip 201 when the second chip 211 is edge-coupled to the first chip 201. In some embodiments, the air gap size 221 is within a range extending from about 10 nanometers to about 10 micrometers.

Figure 2C:
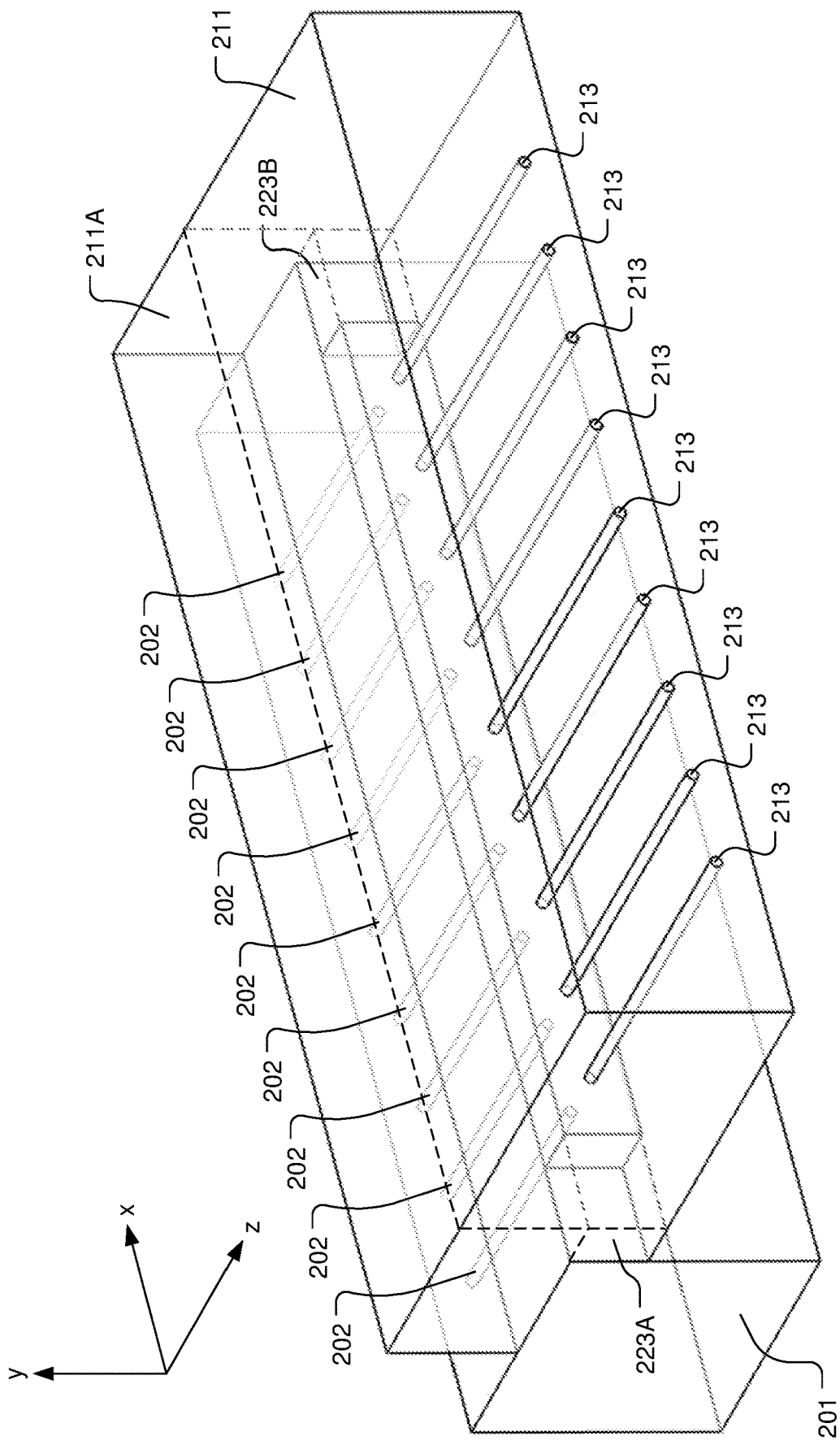
FIG. 2C shows a perspective view of the second chip positioned in an edge-coupled configuration with the first chip, in accordance with some embodiments.

FIG. 2C shows a perspective view of the second chip 211 positioned in an edge-coupled configuration with the first chip 201, in accordance with some embodiments. The second chip 211 is positioned so that the exposed surface 223A1 of the first spacer 223 and the exposed surface 223B1 of the second spacer 223B contact the facet 203 of the first chip 201. Also, the second chip 211 is positioned so that the portion 211A of the second chip that extends in the z-direction from the facet 215 to the edge of the second chip 211 rests on the first chip 201. The vertical etch distance 217 of the facet 215 of the second chip 211 is controlled with micrometer-level or sub-micrometer level precision to provide for passive alignment in the vertical direction (y-direction) between the optical waveguides 202 of the first chip 201 and the optical waveguides 213 of the second chip 211 when the portion 211A of the second chip 201 is positioned to rest on the first chip 201 in the edge-coupled configuration. In some embodiments, the vertical etch distance 217 of the facet 215 of the second chip 211 is controlled such that a distance 226 (see FIG. 2B) from the optical waveguides 213 to the bottom of the facet 215 substantially matches the material thickness 204 above the optical waveguides 202 on the first chip 201, such that when the portion 211A of the second chip 211 is brought into contact with the first chip 201 in the edge-coupled configuration of FIG. 2C the optical waveguides 213 of the second chip 211 are optically aligned in the vertical direction (y-direction) with respective optical waveguides 202 of the first chip 201. Also, the first spacer 223A and the second spacer 223B of the second chip 211 passively establish and maintain the required air gap size 221 in the z-direction (of micrometer-level or sub-micrometer-level precision) between the optical waveguides 213 of the second chip 211 and the optical waveguides 202 of the first chip 201.

Figure 2D:
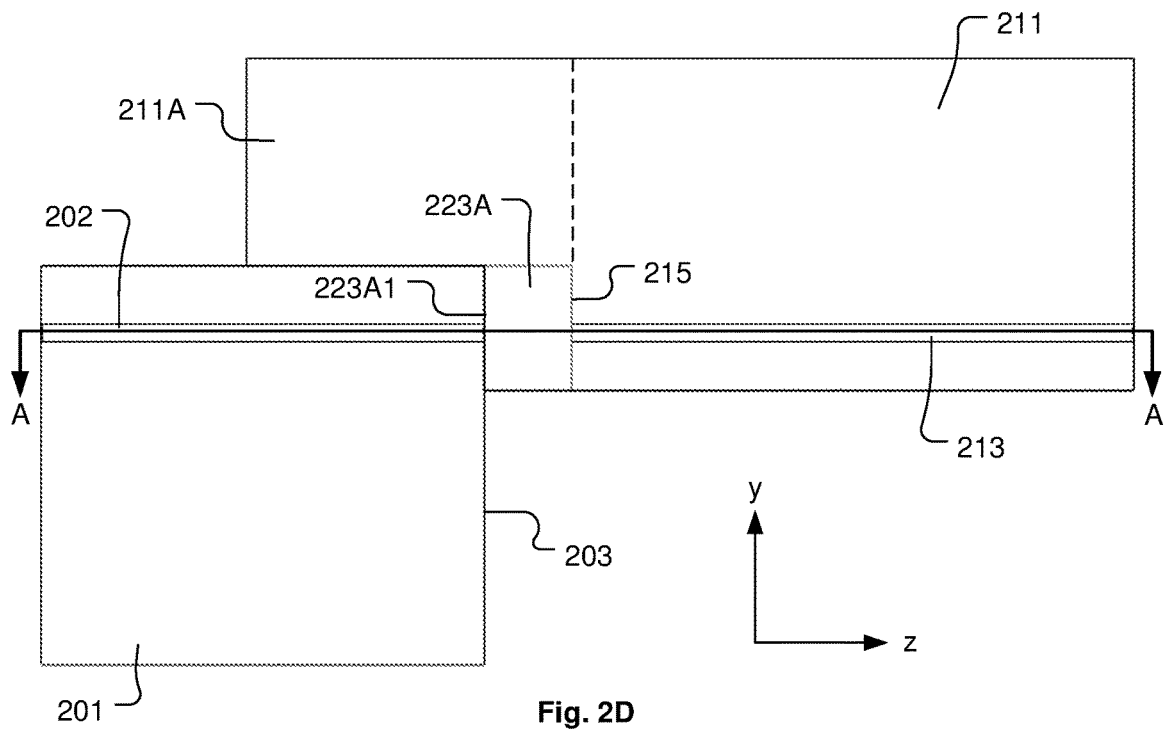
FIG. 2D shows a side view of the first chip and the second chip in the edge-coupled configuration, in accordance with some embodiments.
Figure 2E:
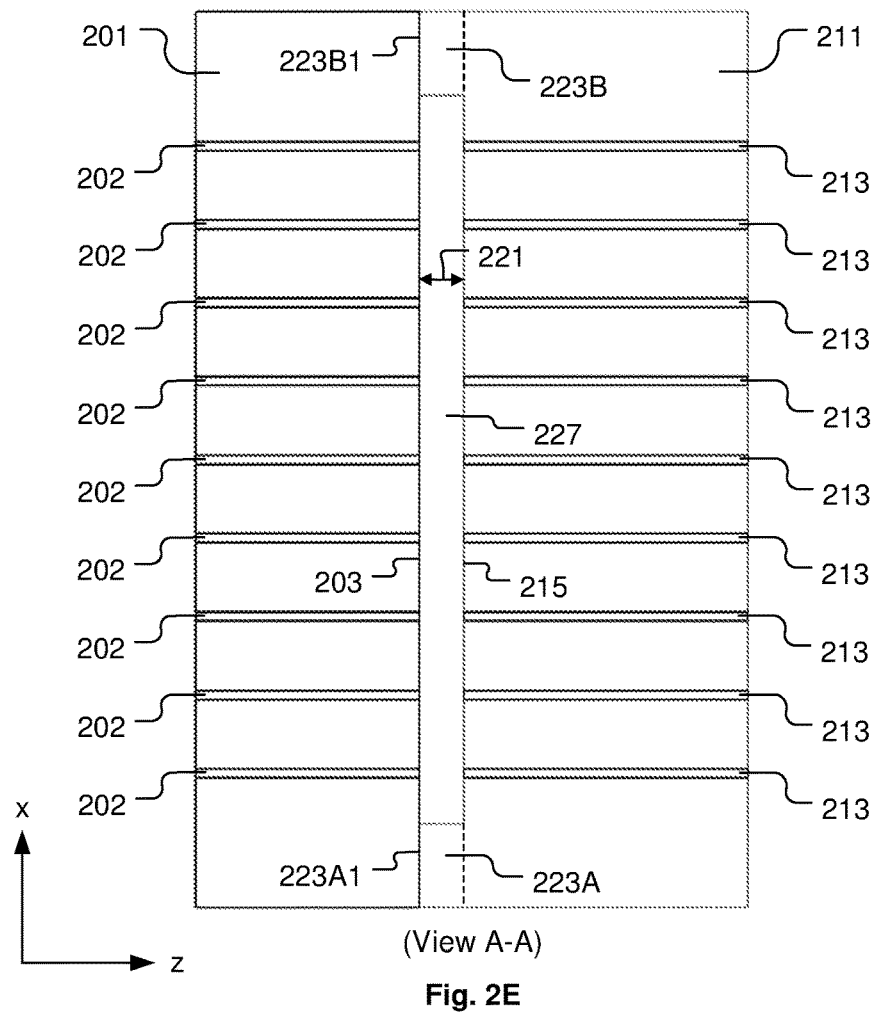
FIG. 2E shows a horizontal cross-section view through the edge-coupling region between the first chip and the second chip, referenced as View A-A in FIG. 2D, in accordance with some embodiments.

FIG. 2D shows a side view of the first chip 201 and the second chip 211 in the edge-coupled configuration, in accordance with some embodiments. The portion 211A of the second chip 211 is positioned in contact with the first chip 201. The vertical etch distance 217 of the facet 215 of the second chip 211 provides for passive alignment of the optical waveguides 202 of the first chip 201 with the optical waveguides 213 of the second chip 211 in the vertical direction (y-direction). FIG. 2E shows a horizontal cross-section view through the edge-coupling region between the first chip 201 and the second chip 211, referenced as View A-A in FIG. 2D, in accordance with some embodiments. The surface 223A1 of the first spacer 223A is in contact with the facet 203 of the first chip 201, and the surface 223B1 of the second spacer 223B is in contact with the facet 203 of the first chip 201. An air gap 227 having the size 221 as measured in the z-direction is established between the facet 203 of the first chip 201 and the facet 215 of the second chip 211. In this manner, the first spacer 223A and the second spacer 223B establish and maintain a substantially uniform and controlled air gap thickness (on the micrometer-level or sub-micrometer level) between the optical waveguides 202 of the first chip 201 and the optical waveguides 213 of the second chip 211, such that respective pairs of the optical waveguides 202 and 213 are optical aligned and optically coupled with each other.

It should be understood that the first spacer 223A and the second spacer 223B on the second chip 211 provide for edge-coupling of the second chip 211 to the first chip 201 without having to utilize active optical alignment techniques to control the air gap distance/size 221 between the facet 215 of the second chip 211 and the facet 203 of the first chip 201. Also, the first spacer 223A and the second spacer 223B on the second chip 211 provide for edge-coupling of the second chip 211 to the first chip 201 without having to dispose an index-matched epoxy between the facet 203 of the first chip 201 and the facet 215 of the second chip 211. Therefore, it should be understood that the chip-to-chip optical alignment and optical coupling system of FIGS. 2A through 2E avoids the disadvantages of having to use active optical alignment techniques and index-matched epoxy when edge-coupling the second chip 211 to the first chip 201.

Figure 3A:
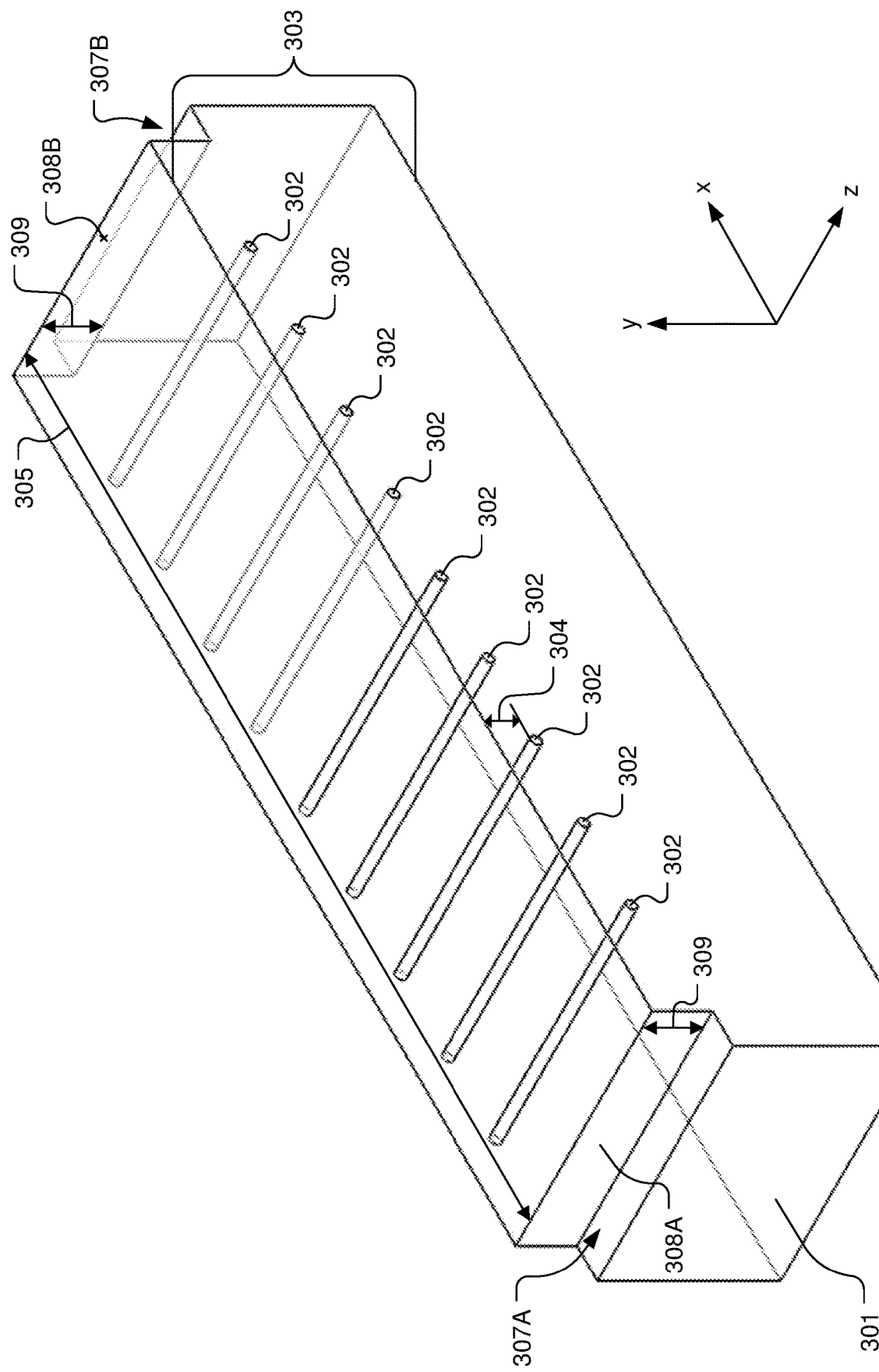
FIG. 3A shows a perspective view of a first chip, in accordance with some embodiments.

FIGS. 3A through 3E show a chip-to-chip optical alignment and optical coupling system in which an air gap is passively defined and maintained between a facet 303 of a first chip 301 and a facet 315 of a second chip 311, in accordance with some embodiments. The chip-to-chip optical alignment and optical coupling system of FIGS. 3A through 3E also provides for passive alignment of the first chip 301 and the second chip 311 in the vertical direction (y-direction). The chip-to-chip optical alignment and optical coupling system of FIGS. 3A through 3E also provides for passive alignment of the first chip 301 and the second chip 311 in the lateral direction (x-direction). FIG. 3A shows a perspective view of the first chip 301, in accordance with some embodiments. The first chip 301 includes a number of optical waveguides 302 extending to the facet 303 for optical edge-coupling of the first chip 301 to the second chip 311. The optical waveguides 302 are exposed at the surface of the facet 303 such that the optical waveguides 302 can be optically aligned and coupled to corresponding optical waveguides 313 in the second chip 311. In some embodiments, the facet 303 corresponds to a side (or edge) of the first chip 301. In the example of FIG. 3A, the facet 303 is oriented substantially parallel to an x-y reference plane, and portions of the optical waveguides 302 near the facet 303 are integrated within the chip 301 to extend in a z-direction substantially perpendicular to the facet 303. In some embodiments, the optical waveguides 302 of the first chip 301 are formed such that a substantially uniform material thickness 304 exists above the optical waveguides 302. It should be understood that in various embodiments, the first chip 301 can include any number of optical waveguides 302. Also, in various embodiments, the first chip 301 can have any type of facet 303, such as an etched facet, a polished facet, or a cleaved facet.

The first chip 301 includes a first lateral alignment trench 307A formed at a first topside edge of the first chip 301 to form a lateral alignment surface 308A. The first chip 301 also includes a second lateral alignment trench 307B formed at a second topside edge of the first chip 301 to form a lateral alignment surface 308B. The first lateral alignment trench 307A and the second lateral alignment trench 307B are formed at respective lateral ends of facet 303. The first lateral alignment trench 307A and the second lateral alignment trench 307B are positioned to bracket the array of optical waveguides 302. In some embodiments, the lateral alignment surface 308A and the lateral alignment surface 308B have a vertical orientation substantially parallel to the y-z reference plane. In these embodiments, the lateral alignment surface 308A and the lateral alignment surface 308B extend substantially parallel to each other in a direction perpendicular to the facet 303 (in the z-direction). In some embodiments, the first lateral alignment trench 307A and the second lateral alignment trench 307B are formed to have a substantially equal depth 309 as measured in the vertical direction (y-direction) from the top surface of the first chip 301. The top surface of the first chip 301 has a width 305 as measured in the lateral direction (x-direction) between the lateral alignment surface 308A of the first lateral alignment trench 307A and the lateral alignment surface 308B of the second lateral alignment trench 307B. In some embodiments, the first lateral alignment trench 307A and the second lateral alignment trench 307B are formed by etching into the top surface of the first chip 301, such that the depth 309 and the width 305 are controlled with micrometer-level or sub-micrometer level precision. In some embodiments, one or both of the first lateral alignment trench 307A and the second lateral alignment trench 307B is/are replaced by a corresponding channel etched into the top surface of the first chip 301, where the channel has two opposing vertical side surfaces and a bottom surface.

It should be understood that for ease of description and to avoid unnecessarily obscuring the disclosure of the embodiments herein, FIG. 3A shows an example portion of the first chip 301 next to the facet 303. It should be understood that the first chip 301 includes additional portions and features beyond what is shown in the example of FIG. 3A. Also, it should be understood that the optical waveguides 302 of the first chip 301 are optically connected to photonic components and/or photonic circuits formed within the first chip 301, which are also not shown to avoid unnecessarily obscuring description of the chip-to-chip optical alignment and optical coupling system of FIGS. 3A through 3E.

Figure 3B:
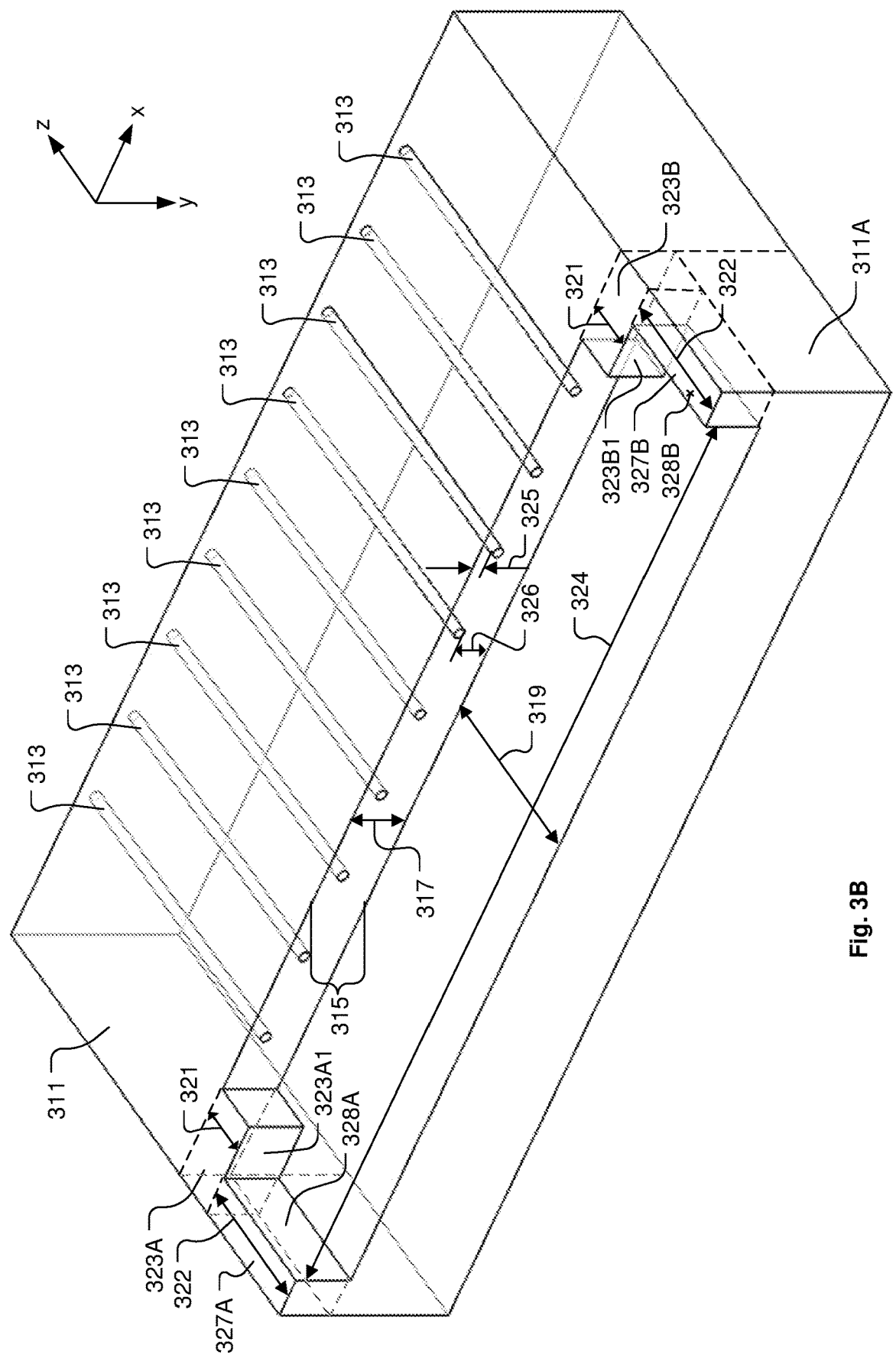
FIG. 3B shows a perspective view of a second chip, in accordance with some embodiments.

FIG. 3B shows a perspective view of the second chip 311, in accordance with some embodiments. The second chip 311 includes the optical waveguides 313 extending to a facet 315 of the second chip 311 for optical edge-coupling of the second chip 311 to the first chip 301. The optical waveguides 313 are exposed at the surface of the facet 315 such that the optical waveguides 313 can be optically aligned and coupled to corresponding optical waveguides 302 in the first chip 301. In some embodiments, the facet 315 corresponds to a side (or edge) of the second chip 311. In the example of FIG. 3B, the facet 315 is oriented substantially parallel to the x-y reference plane, and portions of the optical waveguides 313 near the facet 315 are integrated within the second chip 311 to extend in the z-direction substantially perpendicular to the facet 315. In some embodiments, the optical waveguides 313 of the second chip 311 are formed such that a substantially uniform material thickness 325 exists above each of the optical waveguides 313. It should be understood that in various embodiments the second chip 311 can include any number of optical waveguides 313. The optical waveguides 313 of the second chip 311 are to be respectively optically coupled to the optical waveguides 302 of the first chip 301. Therefore, in some embodiments, the optical waveguides 313 of the second chip 311 are positioned to align with the optical waveguides 302 of the first chip 301 when the second chip 311 is properly aligned with the first chip 301.

It should be understood that for ease of description and to avoid unnecessarily obscuring the disclosure of the embodiments herein, FIG. 3B shows an example portion of the second chip 311 next to the facet 315. It should be understood that the second chip 311 includes additional portions and features beyond what is shown in the example of FIG. 3B. Also, it should be understood that the optical waveguides 313 of the second chip 311 are optically connected to photonic components and/or photonic circuits formed with the second chip 311, which are also not shown to avoid unnecessarily obscuring description of the chip-to-chip optical alignment and optical coupling system of FIGS. 3A through 3E.

The facet 315 of the second chip 311 is etched into the second chip 311 by a distance 319 in the z-direction and by a distance 317 in the y-direction to form photolithographically patterned spacers 323A and 323B on the lateral sides, respectively, of the facet 315, relative to the x-direction. The facet 315 is positioned the distance 319 from the edge of the second chip 311, such that a portion 311A of the second chip 311 extends in the z-direction from the facet 315 to the edge of the second chip 311. The first spacer 323A is positioned at a first end of the facet 315, and the second spacer 323B is positioned at a second end of the facet 315. The first spacer 323A and the second spacer 323B are positioned in the x-direction on each side of the array of optical waveguides 313 so as to bracket the array of optical waveguides 313. The first spacer 323A and the second spacer 323B are formed to provide for passive control of an air gap size 321 (as measured in the z-direction) between the facet 303 of the first chip 301 and the facet 315 of the second chip 311 when the second chip 311 is edge-coupled to the first chip 301. In some embodiments, the first spacer 323A and the second spacer 323B are formed to have substantially co-aligned exposed surfaces 323A1 and 323B1, respectively, oriented substantially parallel to the x-y plane and substantially parallel to the facet 315 surface. In this manner, a substantially uniform distance is maintained between the exposed optical waveguides 313 and the surfaces 323A1 and 323B1 of the first spacer 323A and the second spacer 323B, respectively, across the facet 315. The first spacer 323A and the second spacer 323B are formed with high precision (such as micrometer-level or sub-micrometer-level precision) using semiconductor photolithographic fabrication processes. The first spacer 323A and the second spacer 323B are formed to establish and maintain the micrometer-level or sub-micrometer-level air gap size 321 between the facet 315 of the second chip 311 and the facet 303 of the first chip 301 when the second chip 311 is edge-coupled to the first chip 301. In some embodiments, the air gap size 321 is within a range extending from about 10 nanometers to about 10 micrometers.

The second chip 311 also includes a first lateral alignment feature 327A and a second lateral alignment feature 327B. The first lateral alignment feature 327A extends a distance 322 in the z-direction from the surface 323A1 of the first spacer 323A to the edge of the second chip 311. The second lateral alignment feature 327B extends the distance 322 in the z-direction from the surface 323B1 of the second spacer 323B to the edge of the second chip 311. The first lateral alignment feature 327A and the second lateral alignment feature 327B are positioned to bracket the array of optical waveguides 313. The first lateral alignment feature 327A has a lateral alignment surface 328A. The second lateral alignment feature 327B has a lateral alignment surface 328B. In some embodiments, the lateral alignment surfaces 328A and 328B have a vertical orientation substantially parallel to the y-z reference plane. In these embodiments, the lateral alignment surfaces 328A and 328B extend substantially parallel to each other in a direction substantially perpendicular to the facet 315 (in the z-direction). In some embodiments, the first lateral alignment feature 327A and the second lateral alignment feature 327B are formed to have a substantially equal depth 317 as measured in the vertical direction (y-direction). The first lateral alignment feature 327A and the second lateral alignment feature 327B are separated by a distance 324 as measured in the lateral direction (x-direction).

Figure 3C:
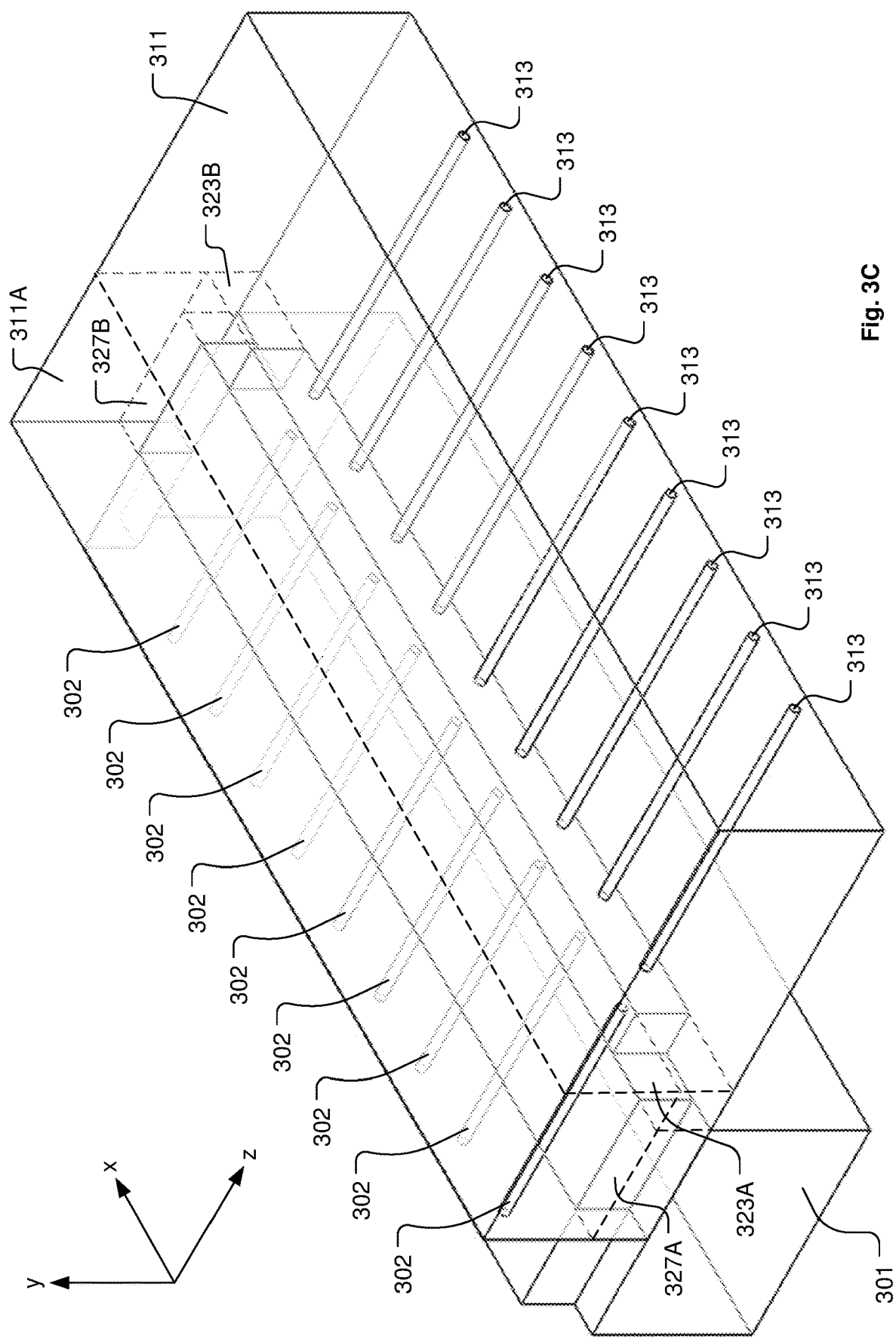
FIG. 3C shows a perspective view of the second chip positioned in an edge-coupled configuration with the first chip, in accordance with some embodiments.

FIG. 3C shows a perspective view of the second chip 311 positioned in an edge-coupled configuration with the first chip 301, in accordance with some embodiments. The second chip 311 is positioned so that the exposed surface 323A1 of the first spacer 323 and the exposed surface 323B1 of the second spacer 323B contact the facet 303 of the first chip 301. Also, the second chip 311 is positioned so that the portion 311A of the second chip that extends in the z-direction from the facet 315 to the edge of the second chip 311 rests on the first chip 301. The vertical etch distance 317 of the facet 315 of the second chip 311 is controlled with micrometer-level or sub-micrometer level precision to provide for passive alignment in the vertical direction (y-direction) between the optical waveguides 302 of the first chip 301 and the optical waveguides 313 of the second chip 311 when the portion 311A of the second chip 301 is positioned to rest on the first chip 301 in the edge-coupled configuration. In some embodiments, the vertical etch distance 317 of the facet 315 of the second chip 311 is controlled to substantially match a distance 326 (see FIG. 3B) from the optical waveguides 313 to the bottom of the facet 315 with the material thickness 304 above the optical waveguides 302 on the first chip 301, such that when the portion 311A of the second chip 311 is brought into contact with the first chip 301 in the edge-coupled configuration of FIG. 3C the optical waveguides 313 of the second chip 311 are optically aligned in the vertical direction (y-direction) with respective optical waveguides 302 of the first chip 301. Also, the first spacer 323A and the second spacer 323B of the second chip 311 passively establish and maintain the required air gap size 321 in the z-direction (of micrometer-level or sub-micrometer-level precision) between the optical waveguides 313 of the second chip 311 and the optical waveguides 302 of the first chip 301.

When the second chip 311 is edge-coupled to the first chip 301 as shown in FIG. 3C, the first lateral alignment feature 327A of the second chip 311 is configured to fit into the first lateral alignment trench 307A of the first chip 301, with the lateral alignment surface 328A of the first lateral alignment feature 327A in contact with the lateral alignment surface 308A of the first lateral alignment trench 307A. Also, when the second chip 311 is edge-coupled to the first chip 301 as shown in FIG. 3C, the second lateral alignment feature 327B of the second chip 311 is configured to fit into the second lateral alignment trench 307B of the first chip 301, with the lateral alignment surface 328B of the first lateral alignment feature 327B in contact with the lateral alignment surface 308B of the first lateral alignment trench 307B. In some embodiments, the first lateral alignment feature 327A and the second lateral alignment feature 327B are formed by etching into the second chip 311, such that the depth 317 and the distance 324 are controlled with micrometer-level or sub-micrometer level precision. With reference to FIGS. 3A and 3B, the distance 305 is substantially equal to the distance 324, such that the first and second lateral alignment features 327A and 327B in conjunction with the first and second lateral alignment trenches 307A and 307B, respectively, provide for passive lateral alignment (in the x-direction) of the optical waveguides 313 of the second chip 311 with the optical waveguides 302 of the first chip 301, with micrometer-level or sub-micrometer-level precision.

Figure 3D:
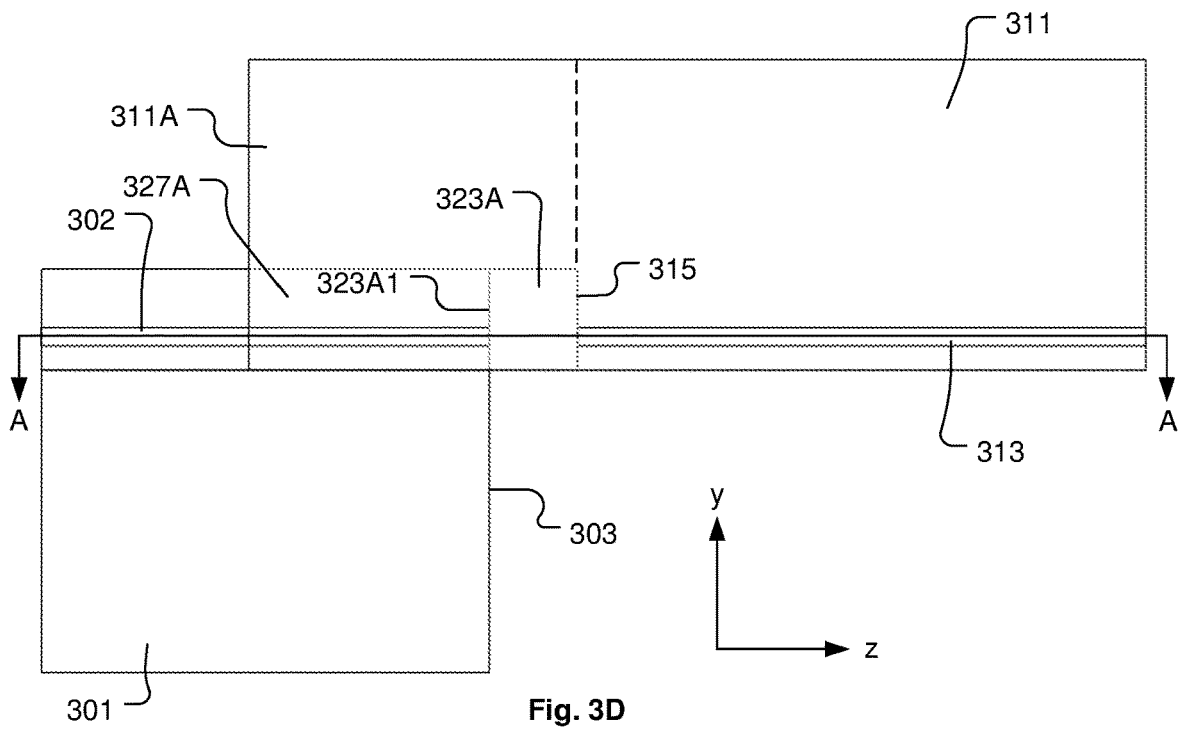
FIG. 3D shows a side view of the first chip and the second chip in the edge-coupled configuration, in accordance with some embodiments.
Figure 3E:
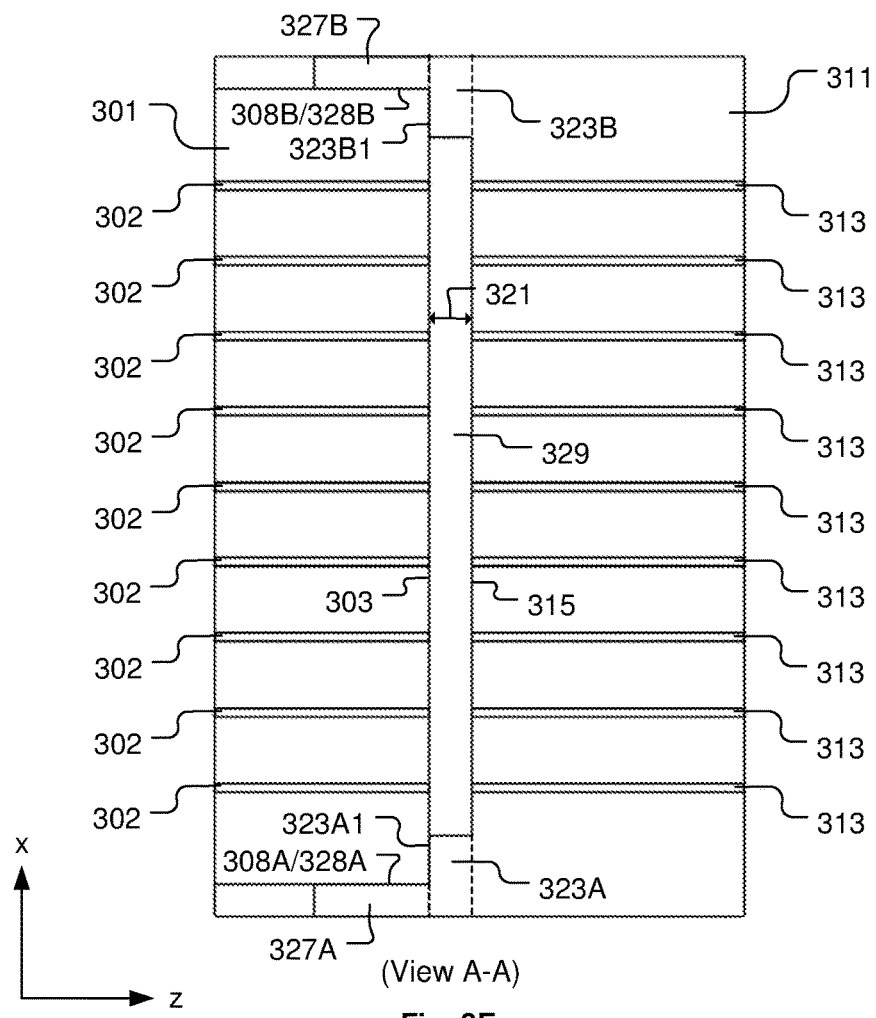
FIG. 3E shows a horizontal cross-section view through the edge-coupling region between the first chip and the second chip, referenced as View A-A in FIG. 3D, in accordance with some embodiments.

FIG. 3D shows a side view of the first chip 301 and the second chip 311 in the edge-coupled configuration, in accordance with some embodiments. The portion 311A of the second chip 311 is positioned in contact with the first chip 301. The vertical etch distance 317 of the facet 315 of the second chip 311 provides for passive alignment of the optical waveguides 302 of the first chip 301 with the optical waveguides 313 of the second chip 311 in the vertical direction (y-direction). FIG. 3E shows a horizontal cross-section view through the edge-coupling region between the first chip 301 and the second chip 311, referenced as View A-A in FIG. 3D, in accordance with some embodiments. The surface 323A1 of the first spacer 323A is in contact with the facet 303 of the first chip 301, and the surface 323B1 of the second spacer 323B is in contact with the facet 303 of the first chip 301. An air gap 327 having the size 321 as measured in the z-direction is established between the facet 303 of the first chip 301 and the facet 315 of the second chip 311. In this manner, the first spacer 323A and the second spacer 323B establish and maintain a substantially uniform and controlled air gap thickness (on the micrometer-level or sub-micrometer level) between the optical waveguides 302 of the first chip 301 and the optical waveguides 313 of the second chip 311, such that respective pairs of the optical waveguides 302 and 313 are optical aligned and optically coupled with each other.

It should be understood that the first spacer 323A and the second spacer 323B on the second chip 311 provide for edge-coupling of the second chip 311 to the first chip 301 without having to utilize active optical alignment techniques to control to the air gap distance/size 321 between the facet 315 of the second chip 311 and the facet 303 of the first chip 301. Also, the first spacer 323A and the second spacer 323B on the second chip 311 provide for edge-coupling of the second chip 311 to the first chip 301 without having to dispose an index-matched epoxy between the facet 303 of the first chip 301 and the facet 315 of the second chip 311. Therefore, it should be understood that the chip-to-chip optical alignment and optical coupling system of FIGS. 3A through 3E avoids the disadvantages of having to use active optical alignment techniques and index-matched epoxy when edge-coupling the second chip 311 to the first chip 301.

Figure 4A:
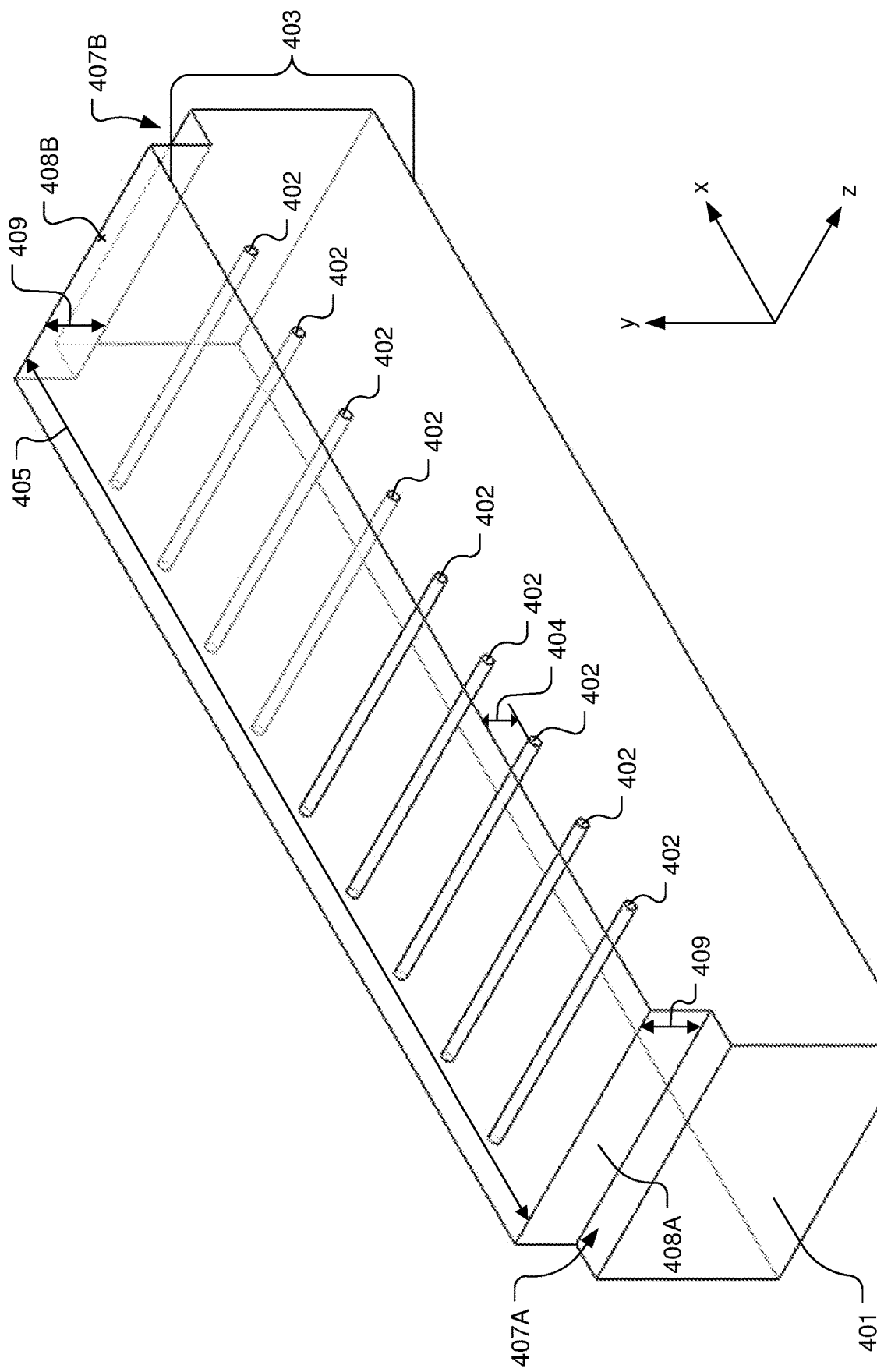
FIG. 4A shows a perspective view of the first chip, in accordance with some embodiments.

FIGS. 4A through 4E show a chip-to-chip optical alignment and optical coupling system in which optical waveguides 402 in a first chip 401 are optically aligned and coupled with respective optical waveguides 413 in a second chip 411, with essentially no air gap between the optical waveguides 402 of the first chip 401 and the optical waveguides 413 of the second chip 411, in accordance with some embodiments. The chip-to-chip optical alignment and optical coupling system of FIGS. 4A through 4E provides for passive alignment of the first chip 401 and the second chip 411 in the vertical direction (y-direction) and the lateral direction (x-direction). FIG. 4A shows a perspective view of the first chip 401, in accordance with some embodiments. The first chip 401 includes a number of the optical waveguides 402 extending to a facet 403 for optical edge-coupling of the first chip 401 to the second chip 411. The optical waveguides 402 are exposed at the surface of the facet 403 such that the optical waveguides 402 can be optically aligned and coupled to corresponding ones of the optical waveguides 413 in the second chip 411. In some embodiments, the facet 403 corresponds to a side (or edge) of the first chip 401. In the example of FIG. 4A, the facet 403 is oriented substantially parallel to an x-y reference plane, and portions of the optical waveguides 402 near the facet 403 are integrated within the chip 401 to extend in a z-direction substantially perpendicular to the facet 403. In some embodiments, the optical waveguides 402 of the first chip 401 are formed such that a substantially uniform material thickness 404 exists above the optical waveguides 402. It should be understood that in various embodiments, the first chip 401 can include any number of optical waveguides 402. Also, in various embodiments, the first chip 401 can have any type of facet 403, such as an etched facet, a polished facet, or a cleaved facet.

The first chip 401 includes a first lateral alignment trench 407A formed at a first topside edge of the first chip 401 to form a lateral alignment surface 408A. The first chip 401 also includes a second lateral alignment trench 407B formed at a second topside edge of the first chip 401 to form a lateral alignment surface 408B. The first lateral alignment trench 407A and the second lateral alignment trench 407B are formed at respective lateral ends of facet 403. The first lateral alignment trench 407A and the second lateral alignment trench 407B are positioned to bracket the array of optical waveguides 402. In some embodiments, the lateral alignment surface 408A and the lateral alignment surface 408B have a vertical orientation substantially parallel to the y-z reference plane. In these embodiments, the lateral alignment surface 408A and the lateral alignment surface 408B extend substantially parallel to each other in a direction perpendicular to the facet 403 (in the z-direction). In some embodiments, the first lateral alignment trench 407A and the second lateral alignment trench 407B are formed to have a substantially equal depth 409 as measured in the vertical direction (y-direction) from the top surface of the first chip 401. The top surface of the first chip 401 has a width 405 as measured in the lateral direction (x-direction) between the lateral alignment surface 408A of the first lateral alignment trench 407A and the lateral alignment surface 408B of the second lateral alignment trench 407B. In some embodiments, the first lateral alignment trench 407A and the second lateral alignment trench 407B are formed by etching into the top surface of the first chip 401, such that the depth 409 and the width 405 are controlled with micrometer-level or sub-micrometer level precision. In some embodiments, one or both of the first lateral alignment trench 407A and the second lateral alignment trench 407B is/are replaced by a corresponding channel etched into the top surface of the first chip 401, where the channel has two opposing vertical side surfaces and a bottom surface.

It should be understood that for ease of description and to avoid unnecessarily obscuring the disclosure of the embodiments herein, FIG. 4A shows an example portion of the first chip 401 next to the facet 403. It should be understood that the first chip 401 includes additional portions and features beyond what is shown in the example of FIG. 4A. Also, it should be understood that the optical waveguides 402 of the first chip 401 are optically connected to photonic components and/or photonic circuits formed within the first chip 401, which are also not shown to avoid unnecessarily obscuring description of the chip-to-chip optical alignment and optical coupling system of FIGS. 4A through 4E.

Figure 4B:
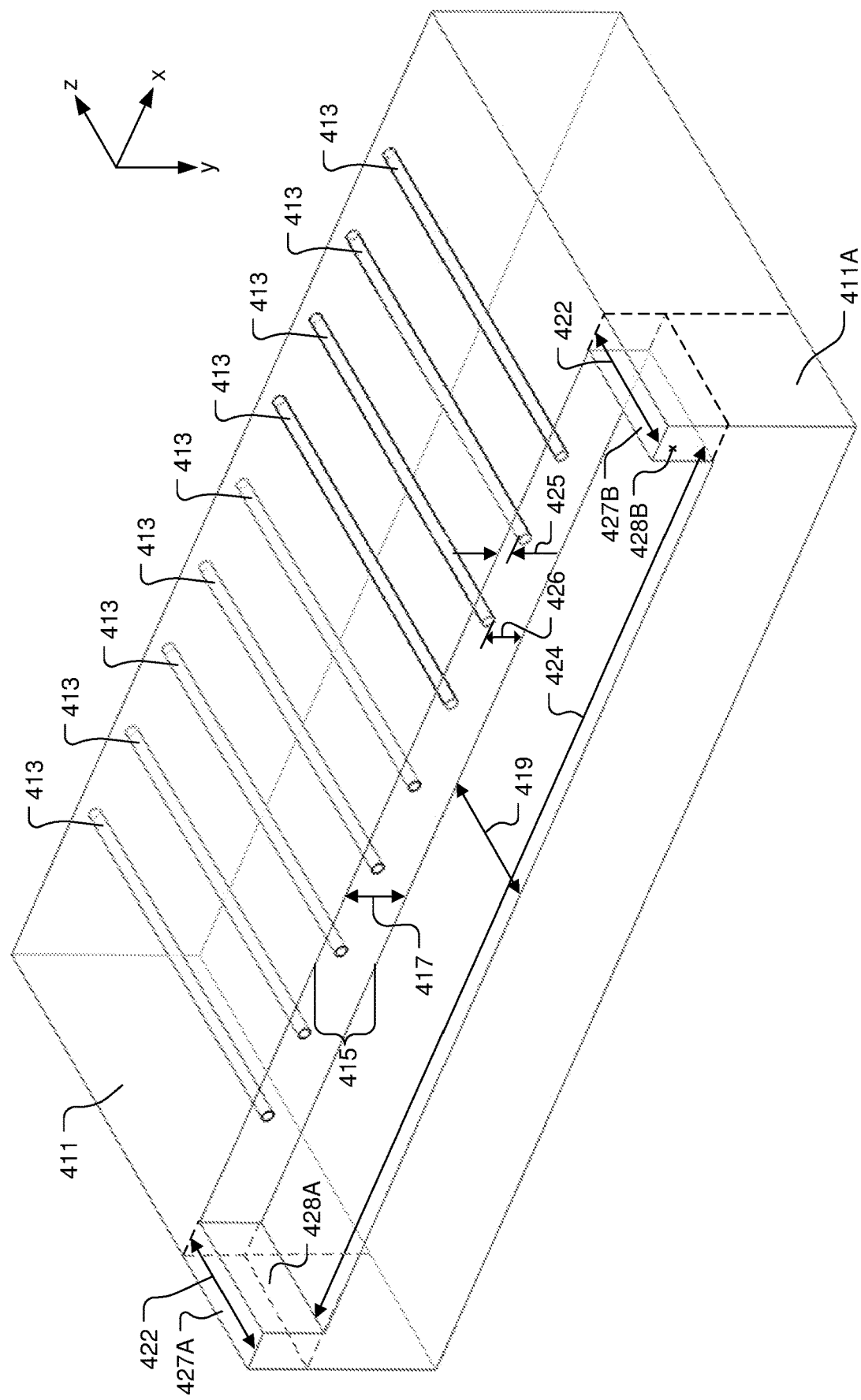
FIG. 4B shows a perspective view of the second chip, in accordance with some embodiments.

FIG. 4B shows a perspective view of the second chip 411, in accordance with some embodiments. The second chip 411 includes the optical waveguides 413 extending to a facet 415 of the second chip 411 for optical edge-coupling of the second chip 411 to the first chip 401. The optical waveguides 413 are exposed at the surface of the facet 415 such that the optical waveguides 413 can be optically aligned and coupled to corresponding optical waveguides 402 in the first chip 401. In some embodiments, the facet 415 corresponds to a side (or edge) of the second chip 411. In the example of FIG. 4B, the facet 415 is oriented substantially parallel to the x-y reference plane, and portions of the optical waveguides 413 near the facet 415 are integrated within the second chip 411 to extend in the z-direction substantially perpendicular to the facet 415. In some embodiments, the optical waveguides 413 of the second chip 411 are formed such that a substantially uniform material thickness 425 exists above each of the optical waveguides 413. It should be understood that in various embodiments the second chip 411 can include any number of optical waveguides 413. The optical waveguides 413 of the second chip 411 are to be respectively optically coupled to the optical waveguides 402 of the first chip 401. Therefore, in some embodiments, the optical waveguides 413 of the second chip 411 are positioned to align with the optical waveguides 402 of the first chip 401 when the second chip 411 is properly aligned with the first chip 401.

It should be understood that for ease of description and to avoid unnecessarily obscuring the disclosure of the embodiments herein, FIG. 4B shows an example portion of the second chip 411 next to the facet 415. It should be understood that the second chip 411 includes additional portions and features beyond what is shown in the example of FIG. 4B. Also, it should be understood that the optical waveguides 413 of the second chip 411 are optically connected to photonic components and/or photonic circuits formed with the second chip 411, which are also not shown to avoid unnecessarily obscuring description of the chip-to-chip optical alignment and optical coupling system of FIGS. 4A through 4E.

The facet 415 of the second chip 411 is etched into the second chip 411 by a distance 419 in the z-direction and by a distance 417 in the y-direction. The facet 415 is positioned the distance 419 from the edge of the second chip 411, such that a portion 411A of the second chip 411 extends in the z-direction from the facet 415 to the edge of the second chip 411. The facet 403 of the first chip 401 and the facet 415 of the second chip 411 are placed in contact with each other when the second chip 411 is edge-coupled to the first chip 401. The facet 403 of the first chip 401 and the facet 415 of the second chip 411 are formed with high precision (such as micrometer-level or sub-micrometer-level precision) using semiconductor photolithographic fabrication processes, such that essentially no gap exists between the facet 403 of the first chip 401 and the facet 415 of the second chip 411 when the second chip 411 is edge-coupled to the first chip 401.

The second chip 411 also includes a first lateral alignment feature 427A and a second lateral alignment feature 427B. The first lateral alignment feature 427A extends a distance 422 in the z-direction from the facet 415 to the edge of the second chip 411. The second lateral alignment feature 427B extends the distance 422 in the z-direction from the facet 415 to the edge of the second chip 411. The first lateral alignment feature 427A and the second lateral alignment feature 427B are positioned to bracket the array of optical waveguides 413. The first lateral alignment feature 427A has a lateral alignment surface 428A. The second lateral alignment feature 427B has a lateral alignment surface 428B. In some embodiments, the lateral alignment surfaces 428A and 428B have a vertical orientation substantially parallel to the y-z reference plane. In these embodiments, the lateral alignment surfaces 428A and 428B extend substantially parallel to each other in a direction substantially perpendicular to the facet 415 (in the z-direction). In some embodiments, the first lateral alignment feature 427A and the second lateral alignment feature 427B are formed to have a substantially equal depth 417 as measured in the vertical direction (y-direction). The first lateral alignment feature 427A and the second lateral alignment feature 427B are separated by a distance 424 as measured in the lateral direction (x-direction).

FIG. 4C shows a perspective view of the second chip 411 positioned in an edge-coupled configuration with the first chip 401, in accordance with some embodiments. The second chip 411 is positioned so that the facet 415 of the second chip 411 is in contact with the facet 403 of the first chip 401. Also, the second chip 411 is positioned so that the portion 411A of the second chip that extends in the z-direction from the facet 415 to the edge of the second chip 411 rests on the first chip 401. The vertical etch distance 417 of the facet 415 of the second chip 411 is controlled with micrometer-level or sub-micrometer level precision to provide for passive alignment in the vertical direction (y-direction) between the optical waveguides 402 of the first chip 401 and the optical waveguides 413 of the second chip 411 when the portion 411A of the second chip 401 is positioned to rest on the first chip 401 in the edge-coupled configuration. In some embodiments, the vertical etch distance 417 of the facet 415 of the second chip 411 is controlled to substantially match a distance 426 (see FIG. 4B) from the optical waveguides 413 to the bottom of the facet 415 with the material thickness 404 above the optical waveguides 402 on the first chip 401, such that when the portion 411A of the second chip 411 is brought into contact with the first chip 401 in the edge-coupled configuration of FIG. 4C the optical waveguides 413 of the second chip 411 are optically aligned in the vertical direction (y-direction) with respective optical waveguides 402 of the first chip 401.

When the second chip 411 is edge-coupled to the first chip 401 as shown in FIG. 4C, the first lateral alignment feature 427A of the second chip 411 is configured to fit into the first lateral alignment trench 407A of the first chip 401, with the lateral alignment surface 428A of the first lateral alignment feature 427A in contact with the lateral alignment surface 408A of the first lateral alignment trench 407A. Also, when the second chip 411 is edge-coupled to the first chip 401 as shown in FIG. 4C, the second lateral alignment feature 427B of the second chip 411 is configured to fit into the second lateral alignment trench 407B of the first chip 401, with the lateral alignment surface 428B of the first lateral alignment feature 427B in contact with the lateral alignment surface 408B of the first lateral alignment trench 407B. In some embodiments, the first lateral alignment feature 427A and the second lateral alignment feature 427B are formed by etching into the second chip 411, such that the depth 417 and the distance 424 are controlled with micrometer-level or sub-micrometer level precision. With reference to FIGS. 4A and 4B, the distance 405 is substantially equal to the distance 424, such that the first and second lateral alignment features 427A and 427B in conjunction with the first and second lateral alignment trenches 407A and 407B, respectively, provide for passive lateral alignment (in the x-direction) of the optical waveguides 413 of the second chip 411 with the optical waveguides 402 of the first chip 401, with micrometer-level or sub-micrometer-level precision.

Figure 4D:
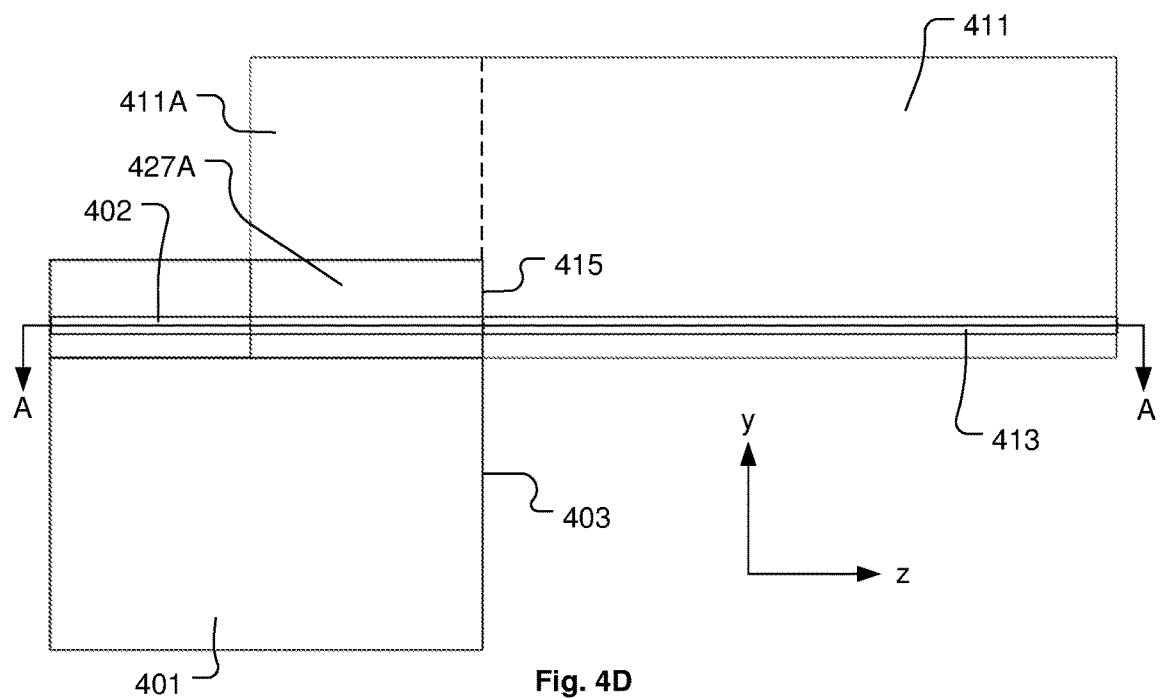
FIG. 4D shows a side view of the first chip and the second chip in the edge-coupled configuration, in accordance with some embodiments.
Figure 4E:
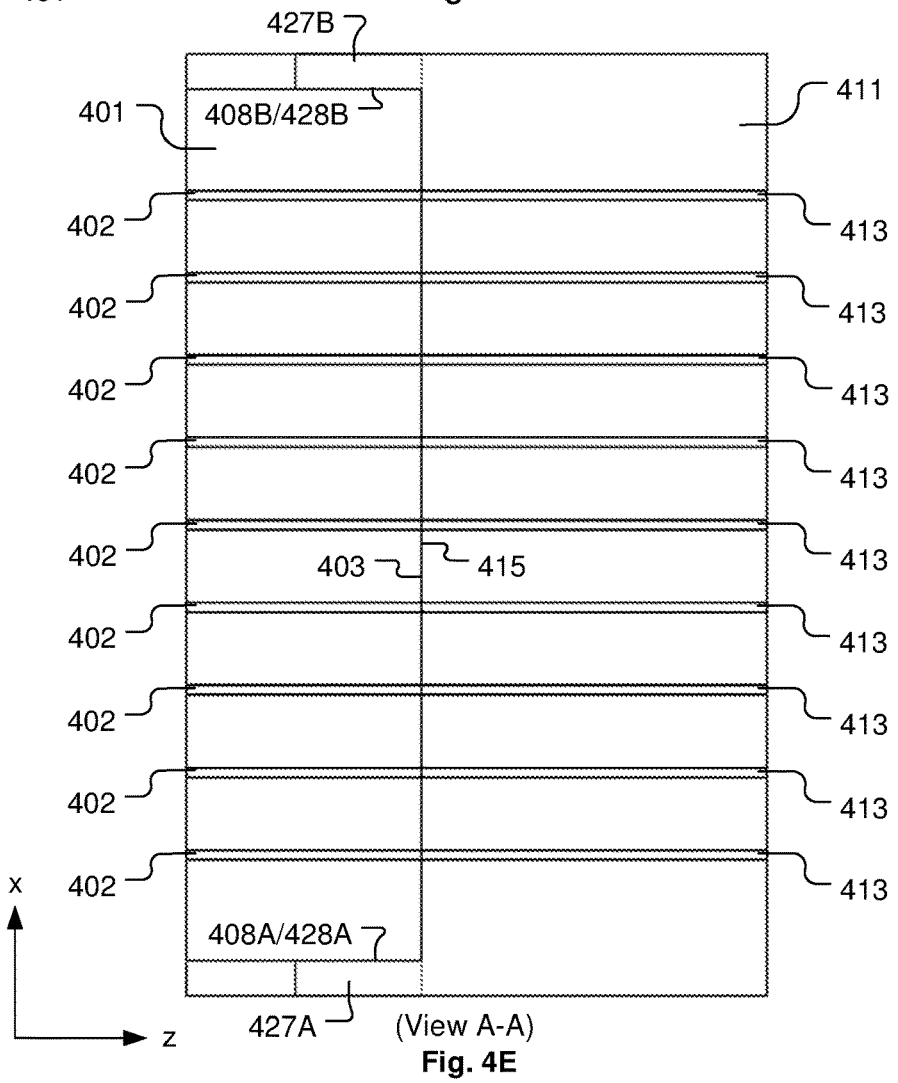
FIG. 4E shows a horizontal cross-section view through the edge-coupling region between the first chip and the second chip, referenced as View A-A in FIG. 4D, in accordance with some embodiments.

FIG. 4D shows a side view of the first chip 401 and the second chip 411 in the edge-coupled configuration, in accordance with some embodiments. The portion 411A of the second chip 411 is positioned in contact with the first chip 401. The vertical etch distance 417 of the facet 415 of the second chip 411 provides for passive alignment of the optical waveguides 402 of the first chip 401 with the optical waveguides 413 of the second chip 411 in the vertical direction (y-direction). FIG. 4E shows a horizontal cross-section view through the edge-coupling region between the first chip 401 and the second chip 411, referenced as View A-A in FIG. 4D, in accordance with some embodiments. The facet 403 of the first chip 401 is in contact with the facet 415 of the second chip 411, such that essentially no gap is present between the facet 403 and the facet 415 when respective pairs of the optical waveguides 402 and 413 are optical aligned and optically coupled with each other.

In accordance with the foregoing, in some embodiments, a system is disclosed for edge-coupling of electro-optic chips. The system includes a first chip (101, 201, 301) that includes a facet (103, 203, 303) formed at an edge of the first chip (101, 201, 301). The first chip (101, 201, 301) includes a first plurality of optical waveguides (102, 202, 302) exposed at the facet (103, 203, 303) of the first chip (101, 201, 301). The system also includes a second chip (111, 211, 311) that includes a facet (115, 215, 315) formed at an edge of the second chip (111, 211, 311). The second chip (111, 211, 311) includes a second plurality of optical waveguides (113, 213, 313) exposed at the facet (115, 215, 315) of the second chip (111, 211, 311). The second plurality of optical waveguides (113, 213, 313) is positioned to align with the first plurality of optical waveguides (102, 202, 302) when the second chip (111, 211, 311) is edge-coupled to the first chip (101, 201, 301).

The second chip (111, 211, 311) includes a first spacer (123A, 223A, 323A) located on a first side of the second plurality of optical waveguides (113, 213, 313). The second chip (111, 211, 311) includes a second spacer (123B, 223B, 323B) located on a second side of the second plurality of optical waveguides (113, 213, 313). The first spacer (123A, 223A, 323A) has an alignment surface (123A1, 223A1, 323A1) oriented substantially parallel to the facet (115, 215, 315) of the second chip (111, 211, 311). The second spacer (123B, 223B, 323B) has an alignment surface (123B1, 223B1, 323B1) oriented substantially parallel to the facet (115, 215, 315) of the second chip (111, 211, 311). The alignment surfaces (123A1, 223A1, 323A1, and 123B1, 223B1, 323B1) of the first and second spacers (123A, 223A, 323A, and 123B, 223B, 323B) are positioned a controlled distance (121, 221, 321) away from the facet (115, 215, 315) of the second chip (111, 211, 311) as measured in a direction (z-direction) perpendicular to the facet (115, 215, 315) of the second chip (111, 211, 311). The second chip (111, 211, 311) is positioned with the alignment surfaces (123A1, 223A1, 323A1, and 123B1, 223B1, 323B1) of the first and second spacers (123A, 223A, 323A, and 123B, 223B, 323B) in contact the facet (103, 203, 303) of the first chip (101, 201, 301) and with the second plurality of optical waveguides (113, 213, 313) respectively aligned with the first plurality of optical waveguides (102, 202, 302).

The first and second spacers (123A, 223A, 323A, and 123B, 223B, 323B) define and maintain an air gap between the first plurality of optical waveguides (102, 202, 302) and the second plurality of optical waveguides (113, 213, 313). The air gap has a size equal to the controlled distance (121, 221, 321) as measured in the direction (z-direction) perpendicular to the facet (115, 215, 315) of the second chip (111, 211, 311). In some embodiments, the controlled distance (121, 221, 321) has micrometer-level precision. In some embodiments, the controlled distance (121, 221, 321) has sub-micrometer-level precision. In some embodiments, the controlled distance (121, 221, 321) is within a range extending from about 10 nanometers to about 10 micrometers. In some embodiments, the size (121, 221, 321) of the air gap is substantially uniform throughout a region between the facet (103, 203, 303) of the first chip (101, 201, 301) and the facet (115, 215, 315) of the second chip (111, 211, 311).

In some embodiments, the facet (115, 215, 315) of the second chip (111, 211, 311) extends through less than an entire thickness of the second chip (111, 211, 311) (in the y-direction), such that a portion (111A, 211A, 311A) of the second chip (111, 211, 311) extends from the facet (115, 215, 315) of the second chip (111, 211, 311) over at least a portion of the first chip (101, 201, 301). In some embodiments, such as shown in FIGS. 1A through 1E, a gap exists between the first chip (101) and the portion (111A) of the second chip (111) that extends from the facet (115) of the second chip (111) over at least the portion of the first chip (101).

In some embodiments, such as shown in FIGS. 2A through 2E and 3A through 3E, the facet (215, 315) of the second chip (211, 311) extends a specified distance (217, 317) into the second chip (211, 311), such that a portion (211A, 311A) of the second chip (211, 311) extends from the facet (215, 315) of the second chip (211, 311) over at least a portion of the first chip (201, 301). The specified distance (217, 317) is defined to achieve alignment of the second plurality of optical waveguides (213, 313) with the first plurality of optical waveguides (202, 302) when the portion (211A, 311A) of the second chip (211, 311) is positioned in contact with the first chip (201, 301). In some embodiments, the specified distance (217, 317) has micrometer-level precision. In some embodiments, the specified distance (217, 317) has sub-micrometer-level precision.

In some embodiments, such as shown in FIGS. 3A through 3E, the first chip (301) includes a first lateral alignment trench (307A) located on a first side of the first plurality of optical waveguides (302) and a second lateral alignment trench (307B) located on a second side of the first plurality of optical waveguides (302). In these embodiments, the second chip (311) includes a first lateral alignment feature (327A) located on a first side of the second plurality of optical waveguides (313) and a second lateral alignment feature (327B) located on a second side of the second plurality of optical waveguides (313). The first lateral alignment feature (327A) is configured to fit into the first lateral alignment trench (307A), and the second lateral alignment feature (327B) is configured to fit into the second lateral alignment trench (307B) when the second plurality of optical waveguides (313) is aligned with the first plurality of optical waveguides (302). In some embodiments, the positions and sizes of the first lateral alignment trench (307A), the second lateral alignment trench (307B), the first lateral alignment feature (327A), and the second lateral alignment feature (327B) are implemented with micrometer-level precision. In some embodiments, the positions and sizes of the first lateral alignment trench (307A), the second lateral alignment trench (307B), the first lateral alignment feature (327A), and the second lateral alignment feature (327B) are implemented with sub-micrometer-level precision.

In some embodiments, a system is disclosed for edge-coupling of electro-optic chips in which a first chip (401) includes a facet (403) formed at an edge of the first chip (401). The first chip (401) includes a first plurality of optical waveguides (402) exposed at the facet (403) of the first chip (401). The system also includes a second chip (411) that includes a facet (415) formed at an edge of the second chip (411). The second chip (411) includes a second plurality of optical waveguides (413) exposed at the facet (415) of the second chip (411). The second plurality of optical waveguides (413) is positioned to align with the first plurality of optical waveguides (402) when the second chip (411) is edge-coupled to the first chip (401). The second chip (411) is positioned with the facet (415) of the second chip (411) in contact with the facet (403) of the first chip (401) and with the second plurality of optical waveguides (413) respectively aligned with the first plurality of optical waveguides (402), such that there is substantially no gap between facet (415) of the second chip (411) and the facet (403) of the first chip (401).

In some embodiments, the facet (415) of the second chip (411) extends a specified distance (417) into the second chip (411), such that a portion (411A) of the second chip (411) extends from the facet (415) of the second chip (411) over at least a portion of the first chip (401). The specified distance (417) is defined to achieve vertical alignment of the second plurality of optical waveguides (413) with the first plurality of optical waveguides (402) when the portion (411A) of the second chip (411) is positioned in contact with the first chip (401). In some embodiments, the specified distance (417) has micrometer-level precision. In some embodiments, the specified distance (417) has sub-micrometer-level precision.

In some embodiments, the first chip (401) includes a first lateral alignment trench (407A) located on a first side of the first plurality of optical waveguides (402) and a second lateral alignment trench (407B) located on a second side of the first plurality of optical waveguides (402). Also, in these embodiments, the second chip (411) includes a first lateral alignment feature (427A) located on a first side of the second plurality of optical waveguides (413) and a second lateral alignment feature (427B) located on a second side of the second plurality of optical waveguides (413). The first lateral alignment feature (427A) is configured to fit into the first lateral alignment trench (407A), and the second lateral alignment feature (427B) is configured to fit into the second lateral alignment trench (407B) when the second plurality of optical waveguides (413) is aligned with the first plurality of optical waveguides (402). In some embodiments, positions and sizes of the first lateral alignment trench (407A), the second lateral alignment trench (407B), the first lateral alignment feature (427A), and the second lateral alignment feature (427B) are implemented with micrometer-level precision. In some embodiments, positions and sizes of the first lateral alignment trench (407A), the second lateral alignment trench (407B), the first lateral alignment feature (427A), and the second lateral alignment feature (427B) are implemented with sub-micrometer-level precision.

Figure 5:
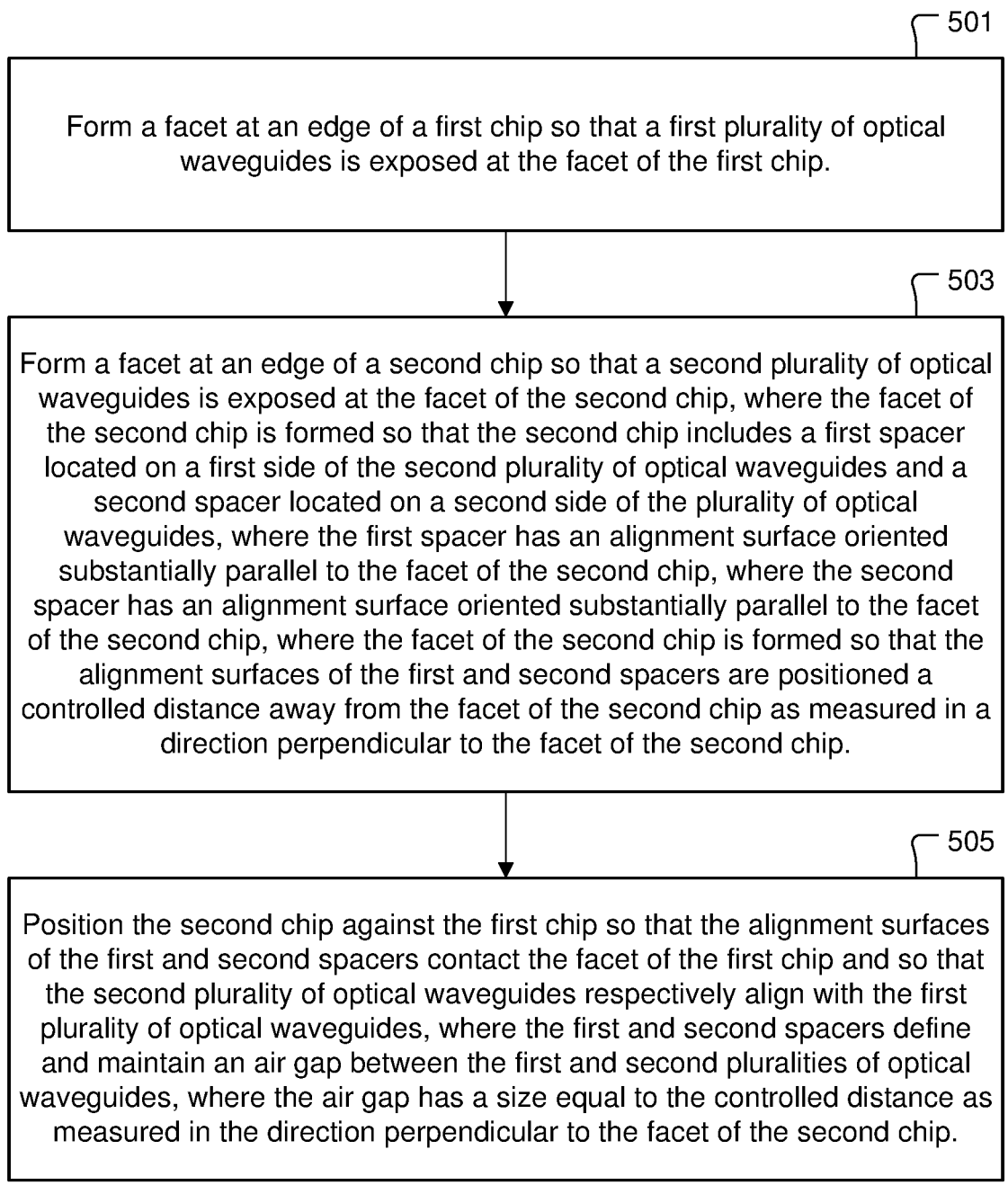
FIG. 5 shows a flowchart of a method for edge-coupling of electro-optic chips, in accordance with some embodiments.

FIG. 5 shows a flowchart of a method for edge-coupling of electro-optic chips, in accordance with some embodiments. The method includes an operation 501 for forming a facet at an edge of a first chip so that a first plurality of optical waveguides is exposed at the facet of the first chip. The method also includes an operation 503 for forming a facet at an edge of a second chip so that a second plurality of optical waveguides is exposed at the facet of the second chip. The facet of the second chip is formed so that the second chip includes a first spacer located on a first side of the second plurality of optical waveguides and a second spacer located on a second side of the plurality of optical waveguides. The first spacer has an alignment surface oriented substantially parallel to the facet of the second chip. The second spacer has an alignment surface oriented substantially parallel to the facet of the second chip. The facet of the second chip is formed so that the alignment surfaces of the first and second spacers are positioned a controlled distance away from the facet of the second chip as measured in a direction perpendicular to the facet of the second chip.

The method also includes an operation 505 for positioning the second chip against the first chip so that the alignment surfaces of the first and second spacers contact the facet of the first chip and so that the second plurality of optical waveguides respectively align with the first plurality of optical waveguides. The first and second spacers define and maintain an air gap between the first and second pluralities of optical waveguides. The air gap has a size equal to the controlled distance as measured in the direction perpendicular to the facet of the second chip. In some embodiments, the controlled distance has micrometer-level precision. In some embodiments, the controlled distance has sub-micrometer-level precision. In some embodiments, the controlled distance is within a range extending from about 10 nanometers to about 10 micrometers.

In some embodiments, the facet of the second chip is formed to extend through less than an entire thickness of the second chip so that a portion of the second chip extends from the facet of the second chip over at least a portion of the first chip when the second chip is positioned against the first chip. In some embodiments, the facet of the second chip is formed so that a gap exists between the first chip and the portion of the second chip that extends from the facet of the second chip over at least the portion of the first chip when the second chip is positioned against the first chip.

In some embodiments, the facet of the second chip is formed to extend a specified distance into the second chip so that a portion of the second chip extends from the facet of the second chip over at least a portion of the first chip when the second chip is positioned against the first chip. In these embodiments, the specified distance is defined to achieve alignment of the second plurality of optical waveguides with the first plurality of optical waveguides when the second chip is positioned against the first chip.

In some embodiments, the method includes an operation for forming a first lateral alignment trench within the first chip on a first side of the first plurality of optical waveguides. In these embodiments, the method also includes an operation for forming a second lateral alignment trench within the first chip on a second side of the first plurality of optical waveguides. In these embodiments, the facet of the second chip is formed so that the second chip includes a first lateral alignment feature located on a first side of the second plurality of optical waveguides and a second lateral alignment feature located on a second side of the second plurality of optical waveguides. The first lateral alignment feature is formed to fit into the first lateral alignment trench, and the second lateral alignment feature is formed to fit into the second lateral alignment trench, when the second plurality of optical waveguides is aligned with the first plurality of optical waveguides when the second chip is positioned against the first chip.

Figure 6:
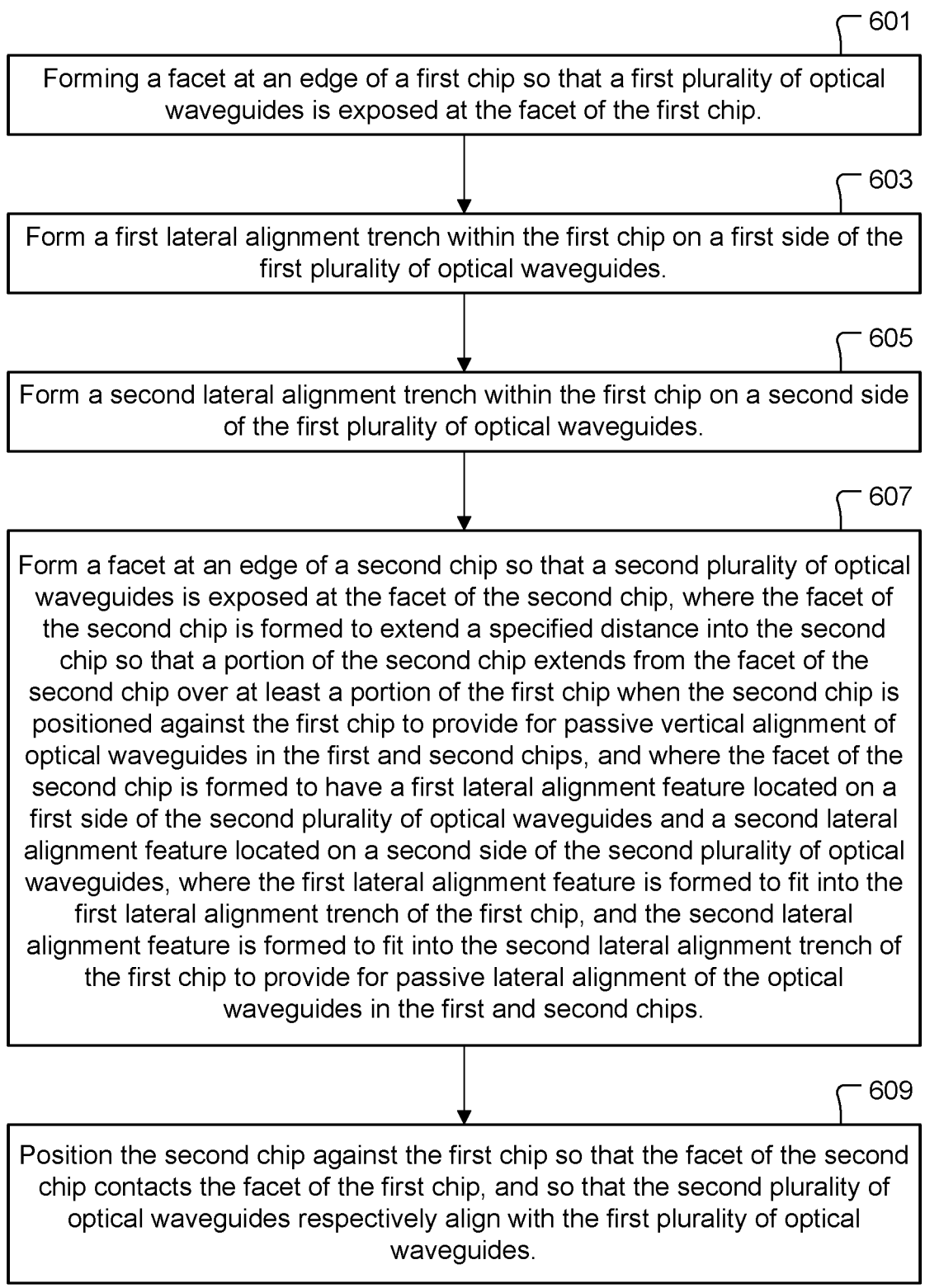
FIG. 6 shows a flowchart of a method for edge-coupling of electro-optic chips, in accordance with some embodiments.

FIG. 6 shows a flowchart of a method for edge-coupling of electro-optic chips, in accordance with some embodiments. The method includes an operation 601 for forming a facet at an edge of a first chip so that a first plurality of optical waveguides is exposed at the facet of the first chip. The method also includes an operation 603 for forming a first lateral alignment trench within the first chip on a first side of the first plurality of optical waveguides. The method also includes an operation 605 for forming a second lateral alignment trench within the first chip on a second side of the first plurality of optical waveguides. The method also includes an operation 607 for forming a facet at an edge of a second chip so that a second plurality of optical waveguides is exposed at the facet of the second chip. The facet of the second chip is formed to extend a specified distance into the second chip so that a portion of the second chip extends from the facet of the second chip over at least a portion of the first chip when the second chip is positioned against the first chip. In these embodiments, the specified distance is defined to achieve vertical alignment of the second plurality of optical waveguides with the first plurality of optical waveguides when the second chip is positioned against the first chip.

Also, in operation 607, the facet of the second chip is also formed so that the second chip includes a first lateral alignment feature located on a first side of the second plurality of optical waveguides and a second lateral alignment feature located on a second side of the second plurality of optical waveguides. The first lateral alignment feature is formed to fit into the first lateral alignment trench of the first chip, and the second lateral alignment feature is formed to fit into the second lateral alignment trench of the first chip, when the second plurality of optical waveguides is aligned with the first plurality of optical waveguides when the second chip is positioned against the first chip. The method also includes an operation 609 for positioning the second chip against the first chip so that the facet of the second chip contacts the facet of the first chip, and so that the second plurality of optical waveguides respectively align with the first plurality of optical waveguides. In these embodiments, operation 609 is performed so that there is substantially no gap between the facet of the second chip and the facet of the first chip.

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although some method operations may be described in a specific order herein, it should be understood that other housekeeping operations may be performed in between method operations, and/or method operations may be adjusted so that they occur at slightly different times or simultaneously or may be distributed in a system which allows the occurrence of the processing operations at various intervals associated with the processing, as long as the processing of the method operations are performed in a manner that provides for successful implementation of the method.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. A system for edge-coupling of electro-optic chips, comprising:
    a first chip including a facet formed at an edge of the first chip, the first chip including a first plurality of optical waveguides exposed at the facet of the first chip; and
    a second chip including a facet formed at an edge of the second chip, the second chip including a second plurality of optical waveguides exposed at the facet of the second chip, the second plurality of optical waveguides positioned to align with the first plurality of optical waveguides when the second chip is edge-coupled to the first chip,
    wherein the second chip is positioned with the facet of the second chip in contact with the facet of the first chip and with the second plurality of optical waveguides respectively aligned with the first plurality of optical waveguides, such that there is substantially no gap between the facet of the second chip and the facet of the first chip, wherein the facet of the second chip extends a specified distance into the second chip such that a portion of the second chip extends from the facet of the second chip over at least a portion of the first chip, the specified distance defined to achieve vertical alignment of the second plurality of optical waveguides with the first plurality of optical waveguides when the portion of the second chip is positioned in contact with the first chip.

2. The system as recited in claim 1, wherein the specified distance has micrometer-level precision.

3. The system as recited in claim 1, wherein the specified distance has sub-micrometer-level precision.

4. The system as recited in claim 1, wherein the first chip includes a first lateral alignment trench located on a first side of the first plurality of optical waveguides, and wherein the second chip includes a first lateral alignment feature located on a first side of the second plurality of optical waveguides, the first lateral alignment feature configured to fit into the first lateral alignment trench when the second plurality of optical waveguides is aligned with the first plurality of optical waveguides.

5. The system as recited in claim 4, wherein positions and sizes of the first lateral alignment trench and the first lateral alignment feature are implemented with micrometer-level precision.

6. The system as recited in claim 4, wherein positions and sizes of the first lateral alignment trench and the first lateral alignment feature are implemented with sub-micrometer-level precision.

7. The system as recited in claim 4, wherein the first chip includes a second lateral alignment trench located on a second side of the first plurality of optical waveguides, and wherein the second chip includes a second lateral alignment feature located on a second side of the second plurality of optical waveguides, the second lateral alignment feature configured to fit into the second lateral alignment trench when the second plurality of optical waveguides is aligned with the first plurality of optical waveguides.

8. The system as recited in claim 7, wherein positions and sizes of the first lateral alignment trench, the second lateral alignment trench, the first lateral alignment feature, and the second lateral alignment feature are implemented with micrometer-level precision.

9. The system as recited in claim 8, wherein positions and sizes of the first lateral alignment trench, the second lateral alignment trench, the first lateral alignment feature, and the second lateral alignment feature are implemented with sub-micrometer-level precision.

10. A method for edge-coupling of electro-optic chips, comprising:
    forming a facet at an edge of a first chip so that a first plurality of optical waveguides is exposed at the facet of the first chip;
    forming a first lateral alignment trench within the first chip on a first side of the first plurality of optical waveguides;
    forming a second lateral alignment trench within the first chip on a second side of the first plurality of optical waveguides;
    forming a facet at an edge of a second chip so that a second plurality of optical waveguides is exposed at the facet of the second chip, wherein the facet of the second chip is formed so that the second chip includes a first lateral alignment feature located on a first side of the second plurality of optical waveguides and a second lateral alignment feature located on a second side of the second plurality of optical waveguides, wherein the first lateral alignment feature is formed to fit into the first lateral alignment trench of the first chip and the second lateral alignment feature is formed to fit into the second lateral alignment trench of the first chip, wherein the facet of the second chip is also formed to extend a specified distance into the second chip so that a portion of the second chip extends from the facet of the second chip over at least a portion of the first chip when the second chip is positioned against the first chip, wherein the specified distance is defined to achieve vertical alignment of the second plurality of optical waveguides with the first plurality of optical waveguides; and positioning the second chip against the first chip so that the facet of the second chip contacts the facet of the first chip and so that the second plurality of optical waveguides respectively align with the first plurality of optical waveguides.

11. The method as recited in claim 10, wherein the specified distance has micrometer-level precision.

12. The method as recited in claim 10, wherein the specified distance has sub-micrometer-level precision.

13. The method as recited in claim 10, wherein there is substantially no gap between the facet of the first chip and the facet of the second chip when the second chip is positioned against the first chip.

14. The method as recited in claim 10, wherein each of the first lateral alignment trench, the second lateral alignment trench, the first lateral alignment feature, and the second lateral alignment feature is formed with micrometer-level precision with respect to position and size.

15. The method as recited in claim 10, wherein each of the first lateral alignment trench, the second lateral alignment trench, the first lateral alignment feature, and the second lateral alignment feature is formed with sub-micrometer-level precision with respect to position and size.

16. The method as recited in claim 10, wherein the first lateral alignment trench has a lateral alignment surface, wherein the first lateral alignment feature also has a lateral alignment surface configured to contact the lateral alignment surface of the first lateral alignment trench, wherein the second lateral alignment trench has a lateral alignment surface, wherein the second lateral alignment feature also has a lateral alignment surface configured to contact the lateral alignment surface of the second lateral alignment trench, and wherein each of the lateral alignment surfaces of the first lateral alignment trench, the first lateral alignment feature, the second lateral alignment trench, and the second lateral alignment feature has a substantially vertical orientation.

17. The method as recited in claim 16, wherein each of the first lateral alignment trench, the second lateral alignment trench, the first lateral alignment feature, and the second lateral alignment feature is formed with micrometer-level precision with respect to position and size.

18. The method as recited in claim 16, wherein each of the first lateral alignment trench, the second lateral alignment trench, the first lateral alignment feature, and the second lateral alignment feature is formed with sub-micrometer-level precision with respect to position and size.

19. The method as recited in claim 16, wherein there is substantially no gap between the facet of the first chip and the facet of the second chip when the second chip is positioned against the first chip.

* * * * *